US008160244B2

(12) United States Patent
Buer

(10) Patent No.: US 8,160,244 B2
(45) Date of Patent: Apr. 17, 2012

(54) STATELESS HARDWARE SECURITY MODULE

(75) Inventor: Mark Buer, Gilbert, AZ (US)

(73) Assignee: Broadcom Corporation, Irvine, CA (US)

( * ) Notice: Subject to any disclaimer, the term of this patent is extended or adjusted under 35 U.S.C. 154(b) by 998 days.

(21) Appl. No.: 11/159,640

(22) Filed: Jun. 21, 2005

(65) Prior Publication Data

US 2006/0072762 A1    Apr. 6, 2006

Related U.S. Application Data

(60) Provisional application No. 60/615,290, filed on Oct. 1, 2004, provisional application No. 60/620,620, filed on Oct. 20, 2004.

(51) Int. Cl.
*H04L 29/06* (2006.01)

(52) U.S. Cl. .......... 380/30; 380/277; 380/278; 380/279; 380/280; 380/281; 380/282; 380/283; 380/284; 380/285; 380/286; 713/171; 713/189; 713/193; 726/3; 705/71; 365/225.7

(58) Field of Classification Search .............. 380/30, 380/277–286; 713/171, 189, 193; 726/3; 705/71; 365/225.7
See application file for complete search history.

(56) References Cited

U.S. PATENT DOCUMENTS

| | | | | |
|---|---|---|---|---|
| 4,937,866 | A | * | 6/1990 | Crowther et al. ............. 380/241 |
| 5,018,197 | A | | 5/1991 | Jones et al. |
| 5,923,191 | A | * | 7/1999 | Nemetz et al. .................. 327/20 |
| 5,999,629 | A | * | 12/1999 | Heer et al. ........................ 705/51 |
| 6,378,070 | B1 | * | 4/2002 | Chan et al. ..................... 713/155 |
| 6,525,955 | B1 | | 2/2003 | Smith et al. |
| 6,577,734 | B1 | * | 6/2003 | Etzel et al. ..................... 380/277 |
| 6,693,819 | B2 | | 2/2004 | Smith et al. |
| 6,700,176 | B2 | | 3/2004 | Ito et al. |
| 6,704,236 | B2 | | 3/2004 | Buer et al. |
| 6,711,263 | B1 | * | 3/2004 | Nordenstam et al. ......... 380/282 |
| 6,714,649 | B1 | * | 3/2004 | Masuda et al. .................. 380/44 |
| 6,996,722 | B1 | * | 2/2006 | Fairman et al. ............... 713/192 |
| 7,002,219 | B1 | * | 2/2006 | de Jong et al. ................ 257/357 |

(Continued)

OTHER PUBLICATIONS

Abdulhadi Shoufan, High-performance Rekeying Processor Architecture for Group key management, IEEE, vol. 58, No. 10.*

(Continued)

*Primary Examiner* — Taghi Arani
*Assistant Examiner* — Josnel Jeudy
(74) *Attorney, Agent, or Firm* — Sterne, Kessler, Goldstein & Fox P.L.L.C.

(57) ABSTRACT

Stateless hardware security modules facilitate securing data transfers between devices in a data communication system. The stateless hardware security module may communicate with other devices via a secure communication channel to securely transfer information between the client device and another device. As a result, sensitive information such as cryptographic keys and data may be securely routed between the client device and another device. The stateless hardware security module may support a limited set of key management operations to facilitate routing of information between the client device and another device. However, the stateless hardware security module does not need to maintain state information for the keys it maintains and/or uses. As a result, the stateless hardware security module may be advantageously integrated into a variety of client devices. A stateless hardware security module may support receiving keys in a secure manner from another device and storing and using these keys within a secure boundary. A stateless hardware security module may support generating a private/public key pair within a secure boundary, maintaining the private key within the secure boundary, and exporting the public key to an authenticating entity.

16 Claims, 15 Drawing Sheets

U.S. PATENT DOCUMENTS

| | | | |
|---|---|---|---|
| 7,194,633 B2* | 3/2007 | Kaiserswerth et al. | 713/189 |
| 7,353,541 B1* | 4/2008 | Ishibashi et al. | 726/26 |
| 2002/0074616 A1 | 6/2002 | Chen et al. | |
| 2003/0028701 A1* | 2/2003 | Rao et al. | 710/305 |
| 2003/0177392 A1* | 9/2003 | Hiltgen | 713/201 |
| 2004/0093494 A1* | 5/2004 | Nishimoto et al. | 713/165 |
| 2005/0002262 A1* | 1/2005 | Huang et al. | 365/225.7 |
| 2005/0071282 A1* | 3/2005 | Lu et al. | 705/64 |
| 2005/0207223 A1* | 9/2005 | Taheri et al. | 365/185.08 |
| 2005/0246553 A1* | 11/2005 | Nakamura et al. | 713/193 |
| 2006/0242685 A1* | 10/2006 | Heard et al. | 726/3 |

OTHER PUBLICATIONS

European Search Report for Application No. EP05017238 and annex ; date of completion Nov. 15, 2005, Berlin (3 pages).

Baldi, L. et al. "*An Advanced Smart Card Family for Public Key Algorithm.*" Electronics, Circuits, and Systems, 1996. ICECS '96, Proceedings of the Third IEEE International Conference on Rodos, Greece (Oct. 13-16, 1996), New York, New York, vol. 1, pp. 558-561.

Virage Logic Corporation. "*NOVeA White Paper. Non-Volatile Embedded Memory in a Standard CMOS Process.*" Virage Logic Corporation 'Online! Oct. 2003, pp. 1-9. Retrieved from the Internet: URL:http://www.viragelogic.com/upload/documents/novea_wp.pdf>, retrieved on Nov. 11, 2005.

Menezes, Oorschot, Vanstone: "*Handbook of Applied Cryptography.*" CRC Press Series on Discrete Mathematics and Its Applications, 1997, pp. 551-553.

\* cited by examiner

STATELESS HARDWARE SECURITY MODULE

CROSS-REFERENCE TO RELATED APPLICATION(S)

This application claims the benefit of U.S. Provisional Patent Application No. 60/615,290, filed Oct. 1, 2004 and U.S. Provisional Patent Application No. 60/620,620, filed Oct. 20, 2004, the disclosure of each of which is hereby incorporated by reference herein.

This application is related to commonly-owned, co-pending U.S. patent application Ser. No. 11/159,669, filed concurrently herewith, entitled CMOS-BASED STATELESS HARDWARE SECURITY MODULE, inventor Mark Buer.

TECHNICAL FIELD

This application relates to data communication systems and, more specifically, to a stateless hardware security module for securing data transfers.

BACKGROUND

The proliferation of distributed computing networks and, in particular, wireless communication networks has brought with it a greater need to secure the information that is transmitted through the networks. For example, the computing power and storage capacity now available in end-user devices such as cell phones and wireless PDAs makes them a convenience mechanism for storing and using sensitive information (e.g., personal and business contact and financial information). However, to store and use this information on an end-user device, a user may need to transmit the information to and from other locations (e.g., a server) via a relatively insecure network.

A variety of cryptographic techniques are known for securing transactions in data networks. For example, the SSL protocol (and its replacement TLS) provides a mechanism for securely sending data between a server and a client. Briefly, the SSL provides a protocol for authenticating the identity of the server and the client and for generating an asymmetric (private-public) key pair. The authentication process provides the client and the server with some level of assurance that they are communicating with the entity with which they intended to communicate. The key generation process securely provides the client and the server with unique cryptographic keys that enable each of them, but not others, to encrypt or decrypt data they send to each other via the network.

This process may be better understood by reference to FIG. 1 which is an abstract drawing 100 of several layers in a security system 102. Entities in the system may securely transfer data between one another by encrypting the data 104 before it is transmitted. Before another entity is able to decrypt received data, however, it must obtain an appropriate key. Hence, data encryption may depend on a secure method of key negotiation 106 between the entities. If the key negotiation is not secure (e.g., the keys are intercepted by unauthorized persons), the encrypted data may be compromised. Consequently, a prerequisite to secure key negotiation may be the ability to authenticate the parties 108 involved in the exchange. In other words, each entity must be sure that it is not negotiating with an entity that is, for example, masquerading as the intended entity. The authentication process ultimately relies on a root key 110 that uniquely and reliably identifies a specific entity. Hence, this root key is often referred to as the cryptographic identity of the entity.

In practice, a system may include many levels of cryptographic protection. For example, a typical e-commerce server may need to negotiate keys with thousands of clients per day. Moreover, these clients typically reside in relatively insecure environments (e.g., personal computers) If the system is to remain secure, the root key should not be used for these transactions given that there is a relatively high possibility that the key may be compromised. Accordingly, in practice the root key is used to generate other keys that may then be used to generate even lower level keys.

Typically, these lower level keys will be used for relatively short periods of time. For example, lower level keys such as SSL session keys may be valid only for a single session. Thus, the potential for damage may be much less when a session key is compromised as opposed to when a higher level key is compromised. For example, in the former case the entire system will not be compromised and the key will expire relatively quickly.

In contrast, once a higher level key is compromised, all subsequent (e.g., lower) levels may be compromised. Moreover, higher level keys tend to be used for relatively long periods of time. Thus, the potential for harm is much greater. Accordingly, protection of higher level keys is a primary goal in any cryptographic security system.

As mentioned above, in a typical e-commerce transaction a unique set of SSL keys are generated for each session. For example, when a user uses a web browser to securely access a financial website for a bank, a set of session keys may be generated for the session. These session keys are used to encrypt and decrypt data sent between the server (e.g., the bank's server) and the client (e.g., the browser). To prevent these keys from being intercepted by unauthorized persons, a higher level key (e.g., a private-public key pair negotiated between the bank's server and the client) will be used to encrypt and decrypt the session level keys. As discussed above, however, protection of this higher level key is of utmost importance.

Referring to FIG. 2, in a typical personal computer-based application, a client device stores its private key (Ka-priv) 214 in a system memory 206 of a computer 200. To reduce the complexity of FIG. 2, the entire computer 200 is not shown. When a session is initiated, the server encrypts the session key (Ks) 228 using the client's public key (Ka-pub) then sends the encrypted session key (Ks)Ka-pub 222 to the client. As represented by lines 216 and 224, the client then retrieves its private key (Ka-priv) 214 and the encrypted session key 222 from the system memory 206 via the PCI bus 208 and loads them into a public key accelerator 210 in an accelerator module or card 202. The public key accelerator 210 uses this downloaded private key (Ka) 220 to decrypt the encrypted session key 222. As represented by line 226, the public key accelerator 210 then loads the clear text session key (Ks) 228 into the system memory 206.

When the server needs to send sensitive data to the client during the session the server encrypts the data using the session key (Ks) and loads the encrypted data [data]Ks 204 into system memory. When a client application needs to access the plaintext (unencrypted) data, it may load the session key 228 and the encrypted data 204 into a symmetric algorithm engine (e.g., 3DES, AES, etc.) 212 as represented by lines 230 and 234, respectively. The symmetric algorithm engine 212 uses the loaded session key 232 to decrypt the encrypted data and, as represented by line 236, loads plaintext data 238 into the system memory 206. At this point the client application may use the data 238.

The SSL protocol and other protocols provide a relatively high level of security for data transfers when both the client and the server are secure. However, given the increased sophistication of hackers and authors of computer viruses, there is a possibility that the security of these devices may be comprised. For example, a virus running on a computer may be able to access data stored in the data memory of the computer. Moreover, the virus may be able to send this information to a third party.

Referring again to the example of FIG. 2, the client's private key (Ka-priv) 214 may be stored in the clear (e.g., unencrypted) in the system memory 606 and it may be transmitted in the clear across the PCI bus 614. Moreover, operating system calls may be used to provide the data transfers to and from the cryptographic accelerator 210. All of these aspects of the system are susceptible to attack by hackers, viruses or other means. Given that in an SSL transaction the client's private key is essentially a certificate that identifies the server (hence it may essentially comprise the server's private key), conventional architectures such as this may not provide sufficient security for many applications.

Components such as a hardware security module ("HSM") may be used to provide a higher level of security for applications that are very security-sensitive. Conventionally, a hardware security module provides secure key management to generate cryptographic keys, sets the capabilities and security limits of keys, implements key backup and recovery, prepares keys for storage and performs key revocation and destruction. These modules are typically constructed as multi-chip boards potted with an epoxy material to provide very strong security. However, due to the use of the epoxy material and the functional key management requirements, a hardware security module is typically a very expensive device that has a large system footprint and has limited capabilities outside of key management.

Due to these constraints, it may be impractical to implement a hardware security module into many types of network components, particularly end-user devices. Accordingly, a need exists for improved techniques for securing data that is used by end-user devices and/or is transmitted through a data network.

SUMMARY

The invention relates to a stateless hardware security module that facilitates securing data transfers between devices. For convenience, an embodiment of a system constructed or a method practiced according to the invention may be referred to herein simply as an "embodiment."

In one aspect of the invention, a stateless hardware security module may be incorporated into a client device (computer, phone, etc.) that needs some level of security processing. In some embodiments, the stateless hardware security module may be incorporated into a chip (e.g., a main processor) in the client device that uses the secured data.

The stateless hardware security module may communicate with other devices to securely transfer information between the client device and another device. For example, in some embodiments the stateless hardware security module communicates with a main security module (e.g., a hardware security module) via a secure data communication channel (secure link). As a result, sensitive information such as cryptographic keys and data may be securely routed between the client device and the hardware security module.

The stateless hardware security module may include one or more cryptographic processing components to facilitate routing of this information. For example, the stateless hardware security module may include components that enable the secure channel to be established. In addition, the stateless hardware security module may include components that process (e.g., encrypt, decrypt, etc.) data sent between devices.

The stateless hardware security module may support a limited set of key management operations to facilitate routing of information between the client device and another device. However, the stateless hardware security module does not need to maintain state information for the keys it maintains and/or uses. As a result, the stateless hardware security module may be advantageously integrated into a variety of client devices.

In some embodiments, a stateless hardware security module may provide four primary functions. First, the module may provide one or more mechanisms to securely enable one or more keys to be provided in (e.g., loaded into, generated within, etc.) a security boundary associated with the module. Second, the module may include a nonvolatile memory for storing the keys within the security boundary. Third, the module may use the keys (e.g., to decrypt data or encrypted keys) without exposing them outside of the security boundary. Fourth, the module may enforce key policy.

In some embodiments, a stateless hardware security module generates one or more keys within the security boundary. In embodiments where the internally generated key is an asymmetric key, the stateless hardware security module may store the private key within the security boundary and may include a mechanism for exporting the public key.

In some embodiments, a stateless hardware security module uses an asymmetric key to establish a secure link with a key management system. This link enables the stateless hardware security module to download any keys and/or other information that may be needed by the client device. The stateless hardware security module's asymmetric key processing also may be used to perform cryptographic operations (e.g., one or more of encryption, decryption, authentication, signing, verification, etc.) on data. The stateless hardware security module may also perform symmetric cryptographic operations on data.

In some embodiments, a stateless hardware security module uses its identity key to acquire other keys (e.g., SSL session keys) from a high-level key management system. The stateless hardware security module may then use the acquired keys to process data for its client device. Thus, the stateless hardware security module may provide certain relatively low level key management functions (e.g., obtaining keys and enforcing policy).

In some embodiments, a stateless hardware security module secures an associated input device. For example, a stateless hardware security module may be used to encrypt and/or sign data from a sensor. Here, the stateless hardware security module may be implemented on the same chip as the input device. These embodiments may enable a device that receives data from an input device to have a high level of assurance that the data actually originated from a specific input device.

In some embodiments, a stateless hardware security module may only provide symmetric key processing for data encryption/decryption, etc. These embodiments may have application space that is substantially smaller than other embodiments because the module may not need to support the use of multiple keys or provide asymmetric data processing. As a result, these embodiments may be advantageously incorporated into relatively small devices such as sensors or input devices.

In some cases these embodiments include asymmetric key processing to facilitate negotiating a secure link with a key management system. A symmetric key may then be downloaded into the stateless hardware security module via the secure link. As mentioned above, in these embodiments the asymmetric key processing may not be used to encrypt/decrypt data. Accordingly, a dedicated asymmetric key processor may not be provided in these embodiments.

In some embodiments, a symmetric key may be injected into a stateless hardware security module during, for example, device manufacture. In these embodiments, some or all of the asymmetric key processing, key generation and external interface functionality may be omitted.

BRIEF DESCRIPTION OF THE DRAWINGS

These and other features, aspects and advantages of the present invention will be more fully understood when considered with respect to the following detailed description, appended claims and accompanying drawings, wherein:

Figure 1:
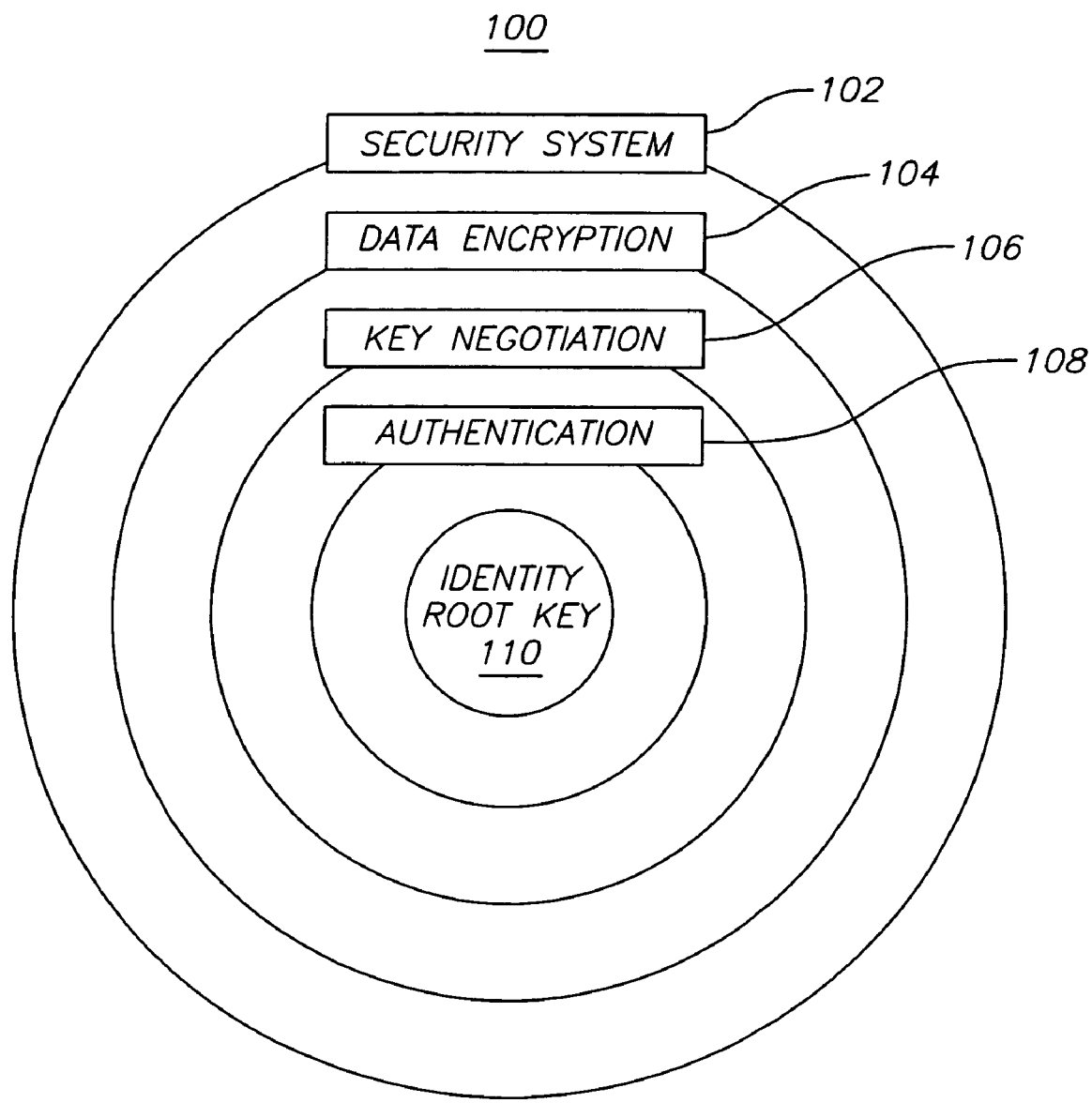
FIG. 1 is a simplified diagram of exemplary layers in a security system.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus or method. Finally, like reference numerals denote like features throughout the specification and figures.

DETAILED DESCRIPTION

The invention is described below, with reference to detailed illustrative embodiments. It will be apparent that the invention may be embodied in a wide variety of forms, some of which may be quite different from those of the disclosed embodiments. Consequently, the specific structural and functional details disclosed herein are merely representative and do not limit the scope of the invention.

In one aspect the invention relates to a stateless hardware security module that may be used to obtain and use cryptographic keys (i.e., cipher keys) and/or to secure data generated by an input device. The stateless hardware security module incorporates hardware structure and cryptographic techniques to provide a relatively high level of security for data and key material.

Figure 3:
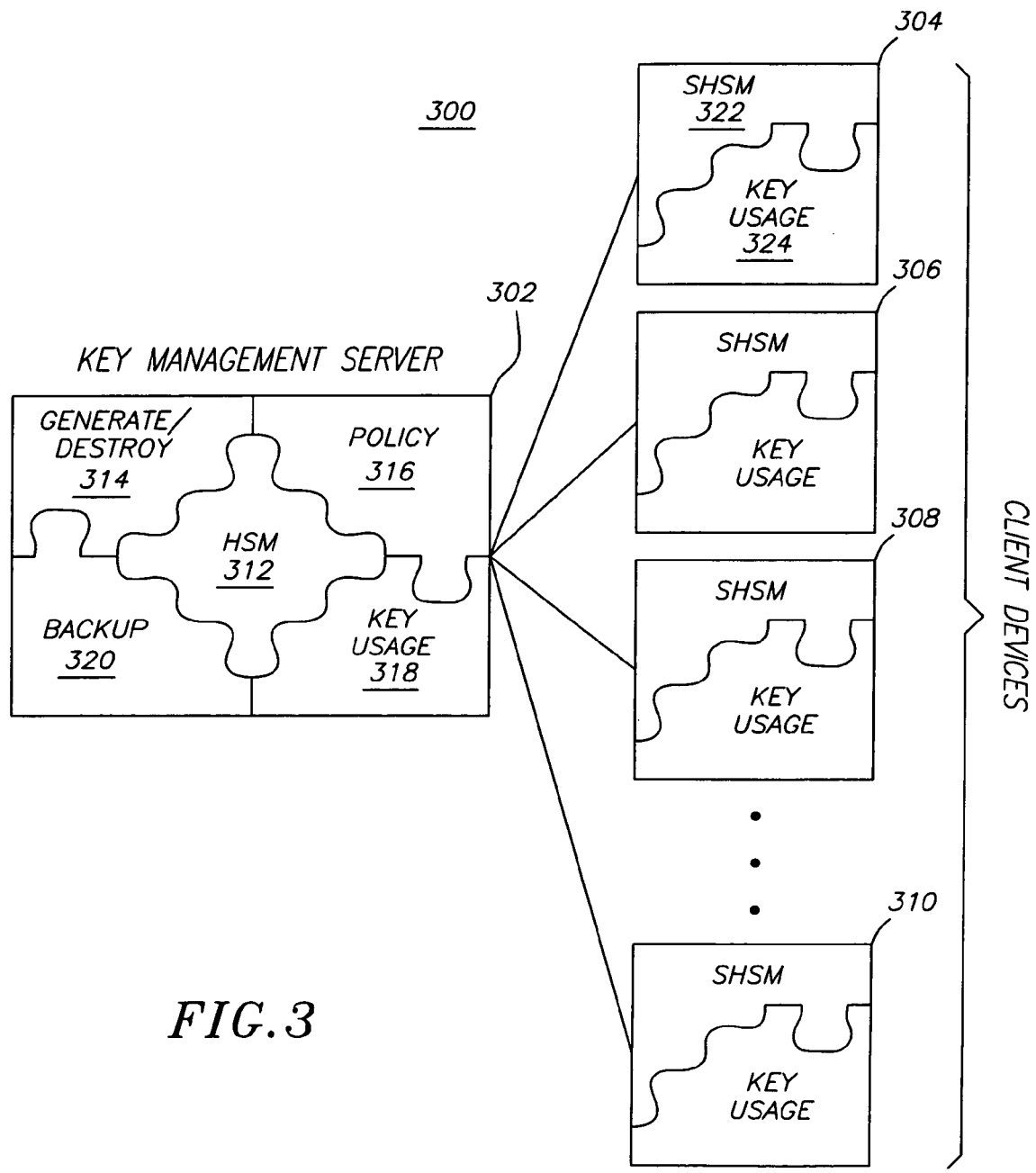
FIG. 3 is a simplified diagram of one embodiment of a security system constructed in accordance with the invention.

FIG. 3 illustrates one embodiment of a key management system 300 that incorporates stateless key management modules (hereafter referred to as stateless modules for convenience). Here, a key manager (e.g., key management server 302) including an HSM 312 is configured to manage multiple remote stateless modules in client devices 304, 306, 308 and 310. For example, client device 304 includes a stateless hardware security module ("SHSM") 322.

The stateless modules provide key enforcement and/or usage functions that are, in effect, separated out from the main key management functions provided by a traditional HSM. For example, the HSM 312 may provide services for secure key management such as generating and destroying keys 314, establishing and enforcing key policy 316, using keys 318, providing key backup and secure key storage 320 and communicating with peers.

Inherently, these operations require that the HSM 312 keep track of its current state. For example, the HSM 312 keeps track of all keys it has generated and maintains state information associated with each of these keys. This information may be used, for example, to identify the entity to which each key was issued and/or to determine when to destroy or revoke keys. Through the use of state information the HSM may enforce an authorization policy to, for example, determine which entities (e.g., devices) may use a key or keys managed by the HSM.

The client device 304 includes components for securely receiving keys (e.g., SHSM 322) and using keys (e.g., key usage component 324). Here, the stateless module 322 may not generate keys or conduct peer-to-peer communication. For example, any keys that are needed for key usage operations may be loaded into the stateless module 322, rather than being generated within the stateless module 322. Thus, the stateless module 322 may receive the keys and associated information needed by its client device from a key manager.

A stateless module does not need to maintain state information to receive keys and use keys. When a stateless module boots up, the only key information it may have is an identity key that is stored in nonvolatile memory. However, this key information is stateless because it does not change. Moreover, in contrast with a key manager, since a stateless module may not generate keys for usage operations, the stateless module may not need to keep track of keys generated for such operations or keep track of any authorization to use such keys.

As mentioned above, a stateless module may enforce key policy. For example, the stateless module may enforce policy (e.g., key expiration) that is received with a key from a key manager. The stateless module may not, however, set the key policy.

To perform its designated tasks, a stateless module may be configured to establish a secure connection with an HSM using its identity key. For example, these components may cooperate to define complementary keys that are used to encrypt data sent from one component to another and decrypt any encrypted data that was received from the other component. This secure connection may therefore be used to enable the stateless module to securely perform the basic operations of receiving and using keys and/or data. These operations do not, however, require that the stateless module maintain the state of these keys. Rather, the stateless module may simply use the keys within a security boundary and enforce any policy associated with (e.g., received with) the keys.

Conventional key usage operations may include one or more of encryption, decryption, authentication, signing and verification. For convenience these terms may simply be referred to herein as cryptographic processing. As an example, after the HSM 312 securely sends keys to the stateless module 322 these keys may be used to decrypt data and/or keys for the client device 304. In addition, the stateless module 322 may send secured (e.g., encrypted and/or authenticated) data to a designated device via a secure connection.

A stateless module provides a secure usage environment that may be remotely separated from, yet cryptographically secured to, an HSM. First, any keys and data within the stateless module may be protected by hardware (e.g., the physical constraints provided by the integrated circuit, i.e., chip, within which the stateless module is implemented). Second, the stateless module may be configured to prevent the keys and data from being exported from the chip in the clear. Third, as illustrated in FIG. 4 a key transfer protocol may be established between an HSM 402 located in a key management server and a stateless module 410 located in a remote system 406 to, for example, allow keys generated in the HSM to be securely transferred to the remote system.

As discussed above an encrypted link (e.g., secure connection) 404 may be used to effectively extend a security boundary 408 of the HSM 408 to include the stateless module 410 and other components associated with the stateless module 410 (e.g., components in the remote system 406). For example, the encrypted link 404 allows for key or other material to be transferred over an insecure communication channel (e.g., a dedicated link or a link through a network such as the Internet) between the HSM 408 and the stateless module 410.

Figure 4:
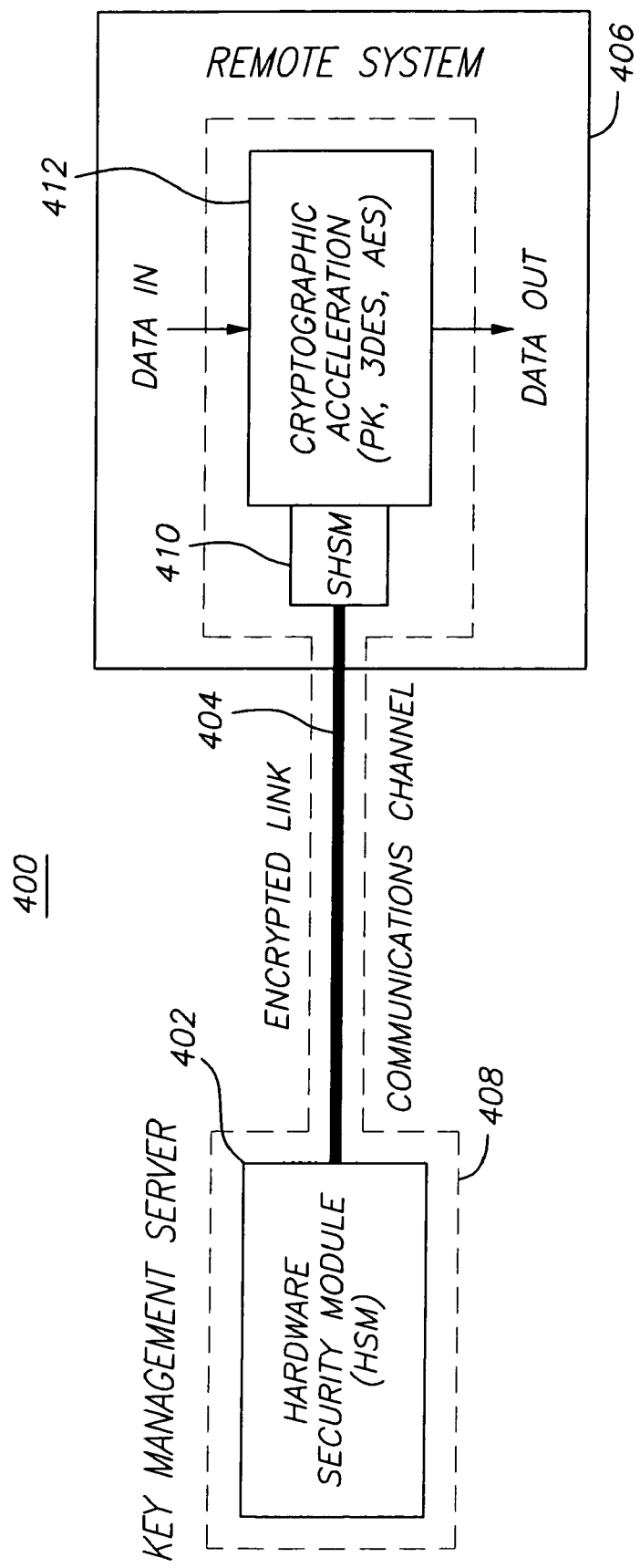
FIG. 4 is a simplified diagram of one embodiment of a security system constructed in accordance with the invention.

FIG. 4 illustrates that the stateless module 410 may receive encrypted key or other material from the HSM 408 for use with other components in the remote system 406 such as a local cryptographic accelerator 412. The cryptographic accelerator 412 also may be implemented within the effective security boundary 408. For example, the cryptographic accelerator 412 and the stateless module 410 may be implemented on the same integrated circuit. Alternatively, keys and data transferred between the components 410 and 412 may be encrypted.

Thus, cleartext and ciphertext may be sent to or received from the cryptographic accelerator 412 and the necessary cryptographic processing may be performed by the cryptographic accelerator 412 without exposing the associated key material outside of the security boundary 408. As a result, any key material that is decrypted locally by the stateless module 410 and provided to the cryptographic accelerator 412 may never be exposed outside the security boundary 408.

In a typical embodiment, a stateless module is embedded inside a client device that uses cryptographic services. For example, the stateless module may be implemented in end-user devices such as cell phones, laptops, etc., that need some form of data security. In some embodiments the stateless module would be integrated into previously existing chips (e.g., a main processor) within these devices.

In this way, the stateless module may provide cost effective remote key management for a client device. The stateless module may provide and/or support any required cryptographic processing for the client device. In addition, a security boundary may be established within the client device to securely maintain and use keys and key material. The system may still be managed, however, by an HSM key management system (through the stateless module). Accordingly, the desired security functionality may be provided using a relatively small (e.g., in die area) and efficient stateless module. Moreover, this functionality may be provided with minimal impact on the rest of the device.

Figure 5:
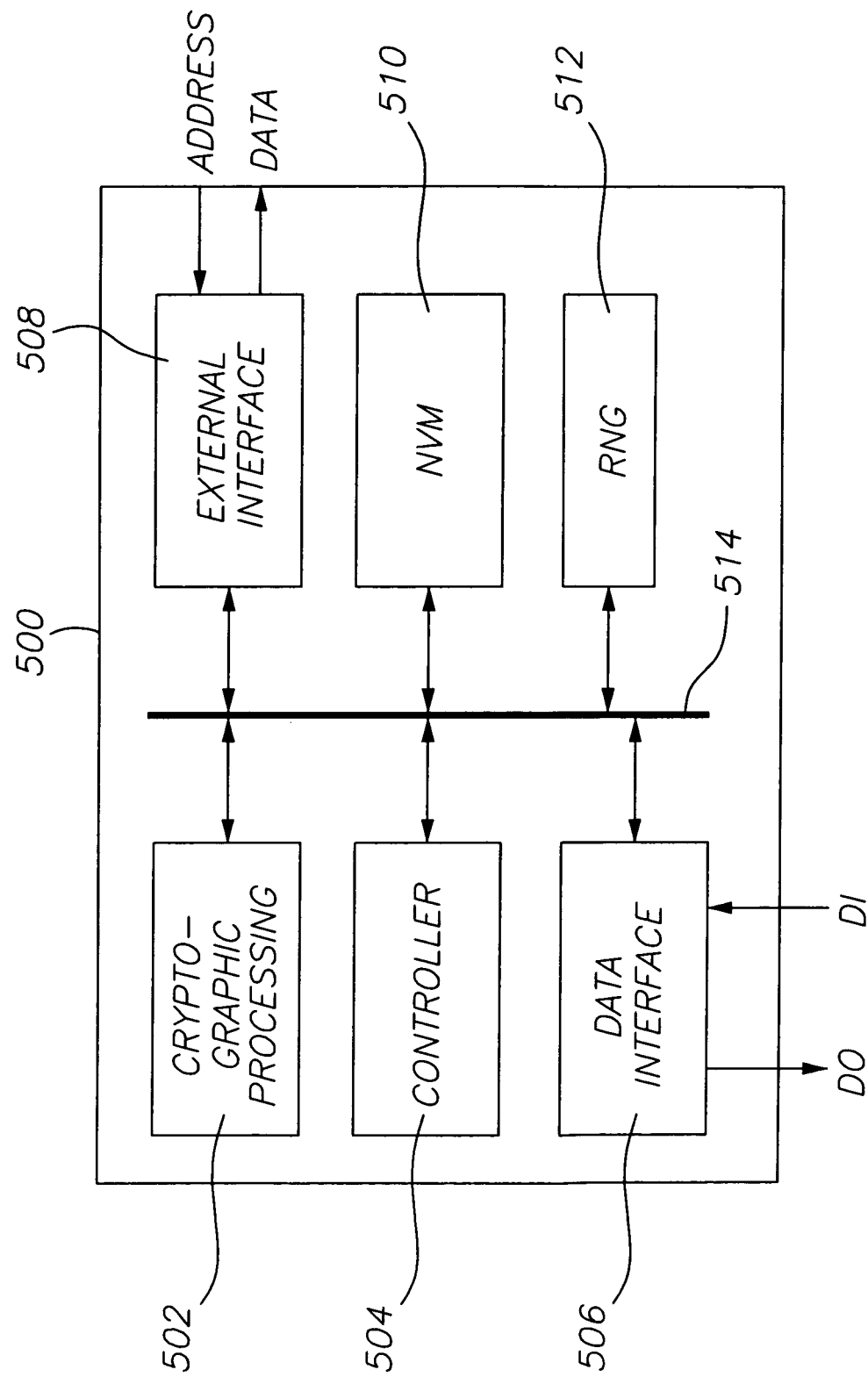
FIG. 5 is a simplified block diagram of one embodiment of a stateless hardware security module constructed in accordance with the invention.

To support this key management scheme, a stateless module provides mechanisms for securely loading one or more keys into the module, securely storing the keys and securely using the keys. One embodiment of a stateless module 500 that provides such mechanisms is depicted in FIG. 5.

The stateless module 500 includes a controller 504 for controlling the overall operation of the module. For example, the controller 504 may control boot operations, key management operations (if applicable) and data and key traffic flow into and out of the module 500. The controller 504 may comprise, for example, a processor and associated code (not shown) and/or a state machine or other hardware. The controller 504 and/or any other component in the stateless module 500 may communicate with other components in the stateless module 500 via an internal bus 514.

A bi-directional external interface 508 provides a mechanism to send keys and/or data to or receive keys and/or data from the module. For example, the external interface 508 may include registers (not shown) that may be written to or read by the controller 504 and external devices that are connected to the stateless module 500. In this case, the controller 504 may be configured so that it never writes certain data (e.g., unencrypted keys) to the registers.

The root, identity key for the module may be stored in an on-chip nonvolatile data memory ("NVM") 510. For example, the NVM may comprise a one-time programmable memory. In this case, an unalterable identity key may be protected within the device.

In some embodiments, one or more keys (e.g., the root, identity key for the module 500) may be injected into the stateless module 500. This may be performed, for example, when the chip housing the module 500 is manufactured, when the chip is tested, during manufacture at an OEM (e.g., a manufacturer that incorporates the chip onto a circuit board), during OEM testing or during installation for the end user. This technique may be used to inject symmetric and/or asymmetric keys.

In some embodiments, the stateless module 500 may generate one or more keys internally. For example, the stateless module may include a random number generator ("RNG") 512 and other circuitry necessary to generate a key. This embodiment may provide added security in that the generated key may never leave the security boundary of the chip.

In some embodiments the stateless module 500 generates an asymmetric key. Here, the private portion of the asymmetric key may be maintained within the security boundary of the chip and/or within any other security boundary associated with the security module 500. The stateless module also may include a mechanism for exporting the public version of the asymmetric key. For example, the public key may be loaded into an external interface register discussed above so that it may be read by an external device via the external interface 508.

A cryptographic processing block 502 may perform any cryptographic processing that needs to be done to generate, acquire or use keys or to cryptographically process data flowing though the module 500. In practice, the processing block 502 may comprise one or more processing blocks. For example, separate blocks may be used to perform asymmetric key algorithms (e.g., DSA, RSA, Diffie-Hellman, etc.), key exchange protocols or symmetric key algorithms (e.g., 3DES, AES, etc.) or authentication algorithms (e.g., HMAC-SHA1, etc.). The cryptographic processing block 502 may be implemented, for example, in hardware and/or using a processor that executes code stored in a data memory (e.g., ROM, flash memory, etc.).

In some embodiments, key information or data to be encrypted or decrypted may be transmitted to/from to the stateless module 500 via one or more bi-directional data interfaces 506. For example, data interface 506 may be connected to a cryptographic accelerator (not shown) that uses keys decrypted by the stateless module 500. Alternatively, a data interface 506 may be connected to an input device (e.g., a sensor, not shown) that generates data that needs to be encrypted by the stateless module 500.

Figure 6:
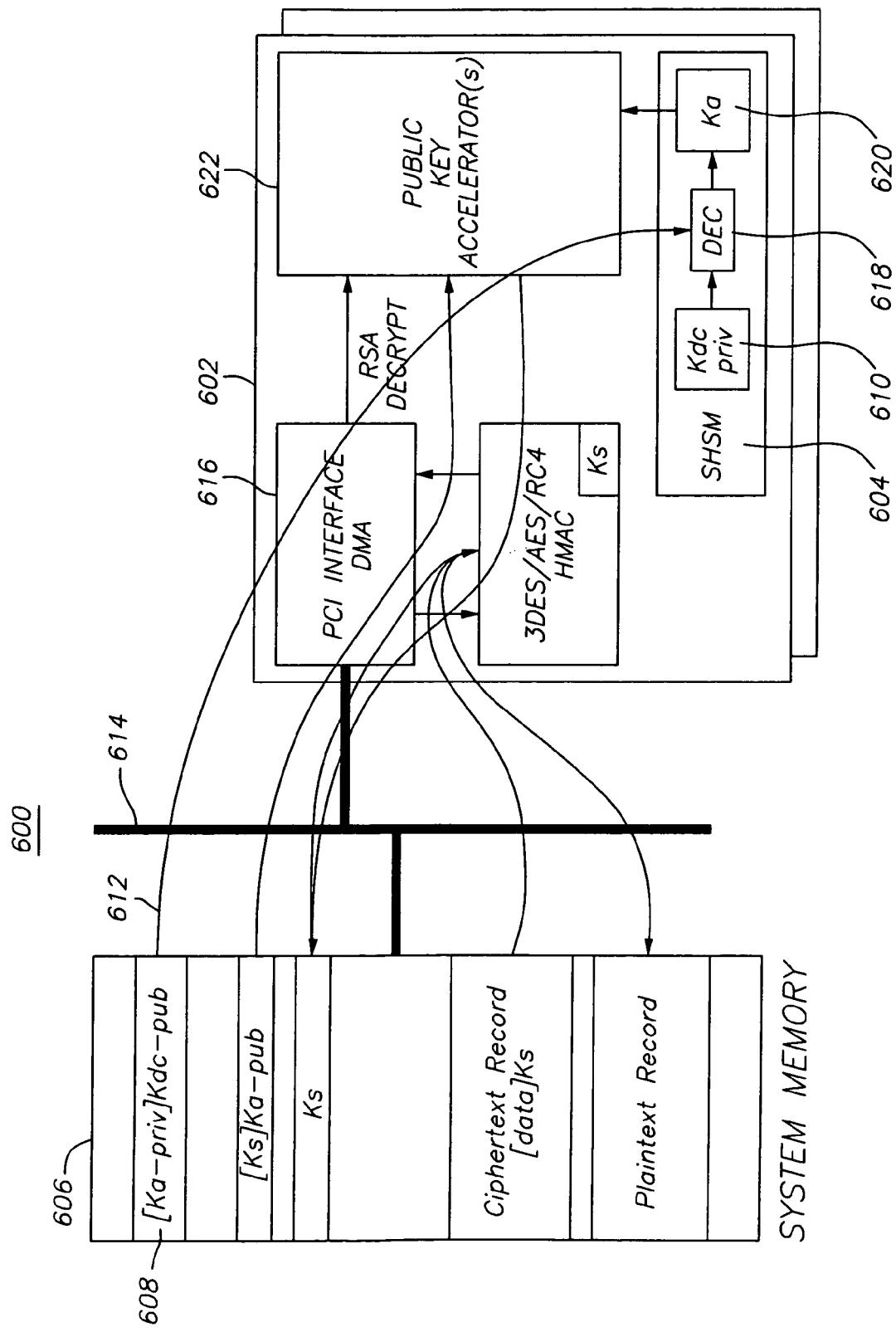
FIG. 6 is a simplified diagram of one embodiment of security processing in a system constructed in accordance with the invention.

Referring now to FIG. 6, the secure usage environment will be discussed in more detail in the context of one embodiment of a PCI bus device 600 that incorporates a stateless module. In FIG. 6 the client's private key (KA-priv) is not stored in system memory 606 in the clear. Rather, the key manager (e.g., an HSM, not shown) that generates this key encrypts it with the public key (Kdc-pub) of a stateless module (e.g., SHSM 604).

Figure 2:
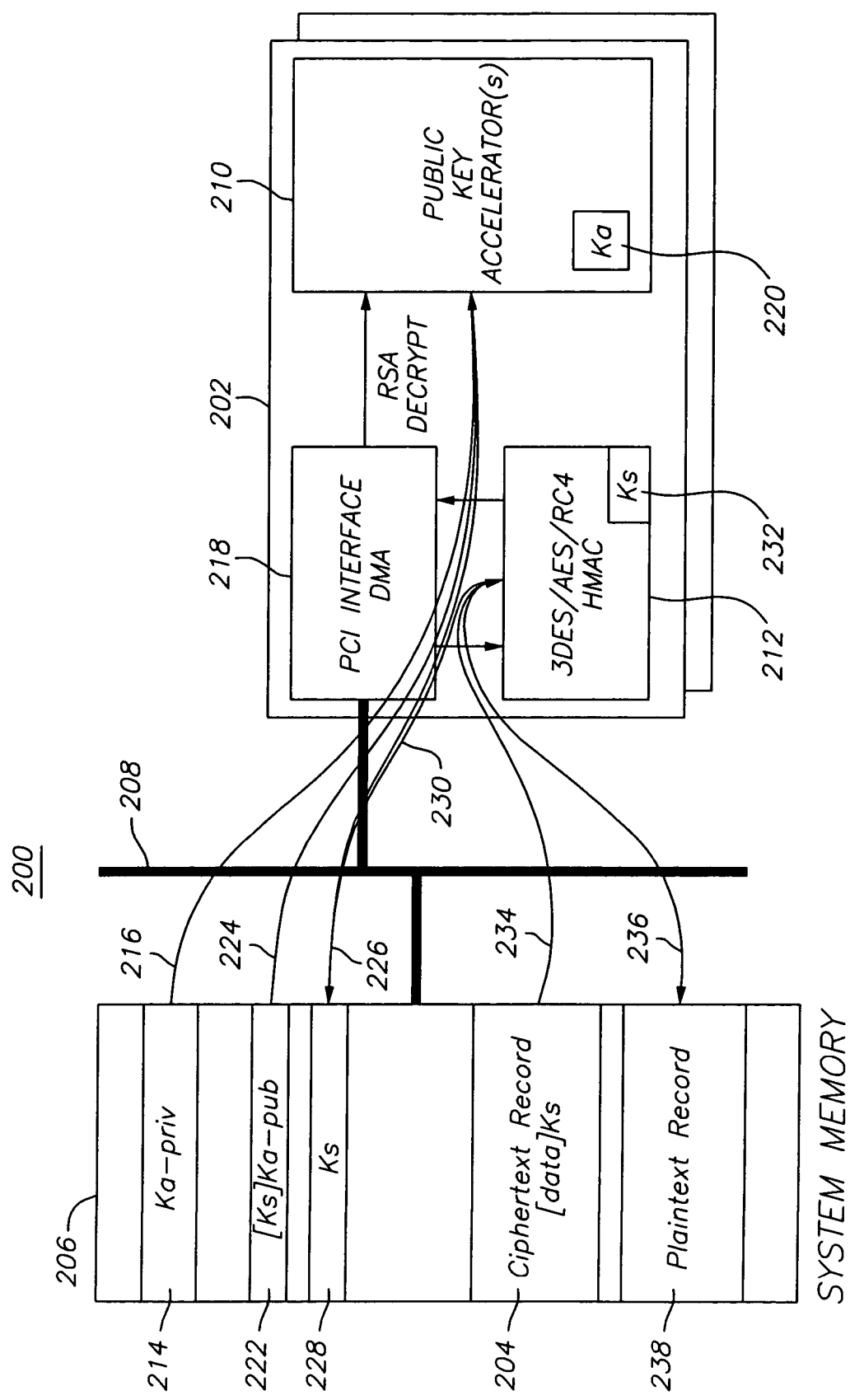
FIG. 2 is a simplified diagram of security processing in a computing system.

To decrypt an encrypted session key (e.g., [Ks]Ka-pub discussed above in conjunction with FIG. 2) the stateless module 604 must first decrypt the encrypted private key 608. Accordingly, the stateless module 604 retrieves the client's encrypted public key 608 from the system memory 606 via a PCI bus 614 and a PCI bus interface 616 as represented by line 612. A decryption processor 618 in the stateless module uses the stateless module's private key (Kdc-priv) 610 to decrypt the encrypted private key 608. As discussed herein, the private key 610 may maintained within a security boundary of the stateless module 604.

In some embodiments the stateless module 604 sends the decrypted private key (Ka) 620 to a public key accelerator 622. Since the accelerator 622 may also be within the security boundary of the stateless module 604, the client's private key (Ka-priv) may never appear in the clear outside of the chip. The remaining operations of the system 600 may, for example, be similar to the operations discussed above in conjunction with FIG. 2.

An example of a key negotiation protocol between a stateless module and a key manager (e.g., an HSM in a key manager) follows. When the stateless module is initialized for the first time after manufacture (e.g., during testing), circuitry in the module may use the random number generator to generate a public-private key pair. The module stores the private (identity) key in the nonvolatile memory. The stateless module then exports the public key and the manufacturer publishes this public key along with a certificate to a public server.

The certificate provides, from a trusted source such as the manufacturer of the module, verification to third parties that the public key may be trusted. For example, an entity that wishes to communicate with the stateless module may be assured by the certificate that the public key is authentic, that the public key is associated with a specific stateless module and that the stateless module protects its private key.

The stateless module may then be deployed, for example, in a computing device that is connected to another device (e.g., a key manager) via a network or some other communication link. When the stateless module is reset it uses its private key to negotiate a secure connection with the key manager. Here, the key manager uses the module's public key that it acquired from the public server. This secure connection may then be realized by each entity using the other entity's public key (or some other negotiated key or set of keys) to encrypt data to be sent to the other entity. The receiving entity may then decrypt the data using its private key (or negotiated key(s)).

Once this secure link protocol is established, the key manager (or, for example, an associated server) may establish secure communications with the client that incorporates the stateless module. For example, the key manager may generate a private key (Ka-priv) for the client. As discussed above, the key manager may encrypt this key using the stateless module's public key (Kdc-pub) before sending it to the client. In a complementary manner, the stateless module may obtain and use the key manager's public key or some other key to sign or encrypt any data that needs to be sent to the key manager, server, etc.

Figure 7:
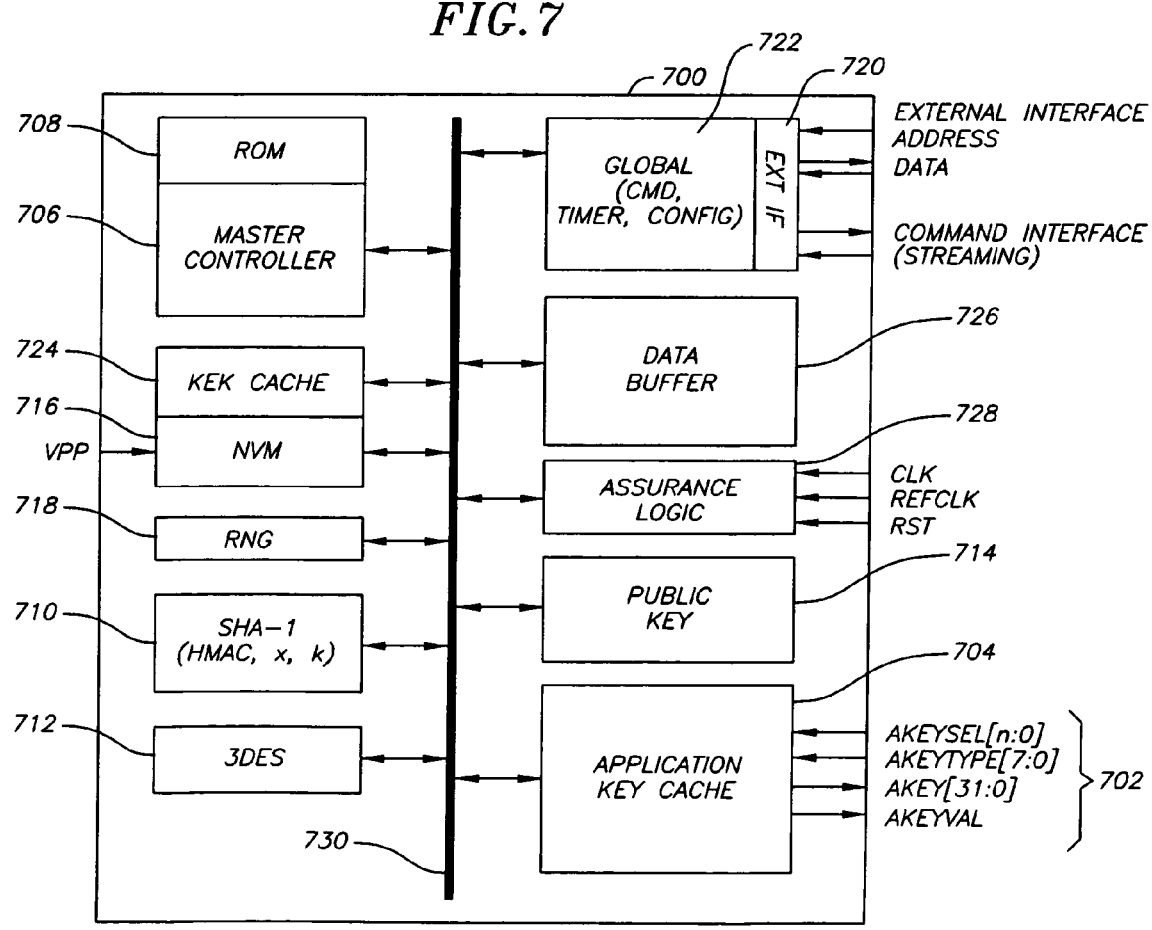
FIG. 7 is a simplified block diagram of one embodiment of a stateless hardware security module constructed in accordance with the invention.

Referring now to FIG. 7, one embodiment of a stateless module 700 will be discussed in more detail. The stateless module (e.g., SHSM) may provide key protection and management (e.g., enforcing proper usage of keys) required for multiple levels of key material. For example, the stateless module may use an initial key to securely load other keys into the stateless module. These other keys may then be used by the stateless module and/or an associated client to cryptographically process data.

The stateless module 700 includes a root key such as an asymmetric key pair (private, public) that may be used to uniquely identify the stateless module 700. In some embodiments such a device identity key may only be used for digital signatures to securely identify the stateless module 700.

The stateless module 700 also may include a privacy (or confidentiality) asymmetric key pair that may be used for transferring secure content (e.g., key material, etc.) to the stateless module 700 from an intermediate insecure third party such that the third party does not have access to the secure content. In some embodiments the stateless module 700 only uses the confidentiality key to decrypt key material within the stateless module 700.

The above long term keys may be stored in a nonvolatile memory ("NVM") 716. The NVM may comprise, for example, a one-time programmable ("OTP") memory or battery backed-up memory (BBMEM). In some embodiments an on-chip OTP memory may be preferred because the contents of the OTP memory need not pass outside of the chip.

An OTP memory 716 may be programmed by the master controller 706 via a programming interface (not shown) in conjunction with an external programming signal VPP. The master controller 706 may ensure that the OTP array 716 is completely clear by reading and writing the long term key cache locations prior to programming. If the array 716 is clear, a single security bit may be programmed first before programming any other bit elements.

After the OTP memory 716 is programmed, the long term keys for the stateless module 700 may be verified by reading corresponding key cache locations in the stateless module 700 to ensure they are correct. Once verified, a second security bit may be programmed by the master controller 706 to complete the initialization process. In this case, the NVM 716 may not mark the long term keys as valid unless both security bits have been programmed.

In some embodiments the local hardware will lock out the programming logic unless both security bits are clear following a reset. This may prevent a partially programmed bit array from being reprogrammed. The above methods help to ensure (via local hardware enforcement) that the device keys, authorization and configuration data may be programmed once and only once. The security bits may be read by hardware after an external reset is released and before the stateless module is released from reset.

In some embodiments the device identity key comprises a collection of random bits that are used to generate the key material for the long term fixed keys in the stateless module 700. For example, a pseudo-random number generator ("RNG") 718 may generate a random number using the internal random number value as a secret initialization seed. The number of bits in the initialization seed may be determined by the amount of key entropy required for the system.

In some embodiments the value from the random number generator 718 is never used directly. For example, this value may be post-processed using an authentication (e.g., SHA-1) block 710 and/or the master controller 706. The resulting random value may then be used internally and exposed external to the stateless module, as necessary. The master controller may maintain a cache of post-processed random bits (e.g., for key generation and for signing) in a data buffer 726.

In some embodiments the random number generator 718 may be a "true" random source. For example, the random number generator 718 may utilize free running oscillators to capture thermal noise as a source of randomness.

In some embodiments the master controller 706 comprises a RISC processor with ROM code 708 to execute the various commands necessary for the operation of the stateless module 700. The master controller block 706 also may include the address decoder for each of the slave blocks on the internal bus 730. The RISC engine may use a protected portion of the data buffer 726 for temporary stack and scratch data space. The protected data region is not allowed to overlap with any space that may be allocated to an external memory interface.

The stateless module 700 may be configured to be part of and/or to define a security boundary. For example, the stateless module may be configured to never allow cleartext keys to exit, for example, the security module or the chip within which the security module is implemented. As a result, the security module may be safely integrated into other devices or systems regardless of whether the system outside of the security boundary is secure.

The external data interface 720 may be used by an eternal device such as a local host (not shown) to read global registers, issue commands and place data into the data buffer 726 for processing by the stateless module 700. In some embodiments, the interface 720 is address mapped. The external interface may be controlled through a global register block 722 by the master controller 706. The global registers 722 may include, for example, command ("CMD"), timer and configuration ("CONFIG") resisters. In some embodiments the master controller controls the transfer of data between the global register block 722 and the data buffer memory 726.

Public key values may be read from the stateless module 700 via the external interface 720. For example, a host may issue a public key read command to the stateless module 700. In response, the stateless module returns the public key value. Any non-secure configuration information for the device (e.g., authorization data, product configuration data, etc.) also may be returned with the public key data.

A command interface may be used to provide a streaming data interface directly into data input and data output registers in the stateless module 700. For example, the command interface may enable an external FIFO (e.g., separate FIFOs) to be used for data input and data output. Such an interface may enable the stateless module to be easily embedded into a packet-based system.

The stateless module 700 includes several cryptographic processing blocks. For example, processing blocks may be incorporated to perform message authentication code algorithms such as HMAC-SHA-1. Processing blocks also may be provided for performing confidentiality symmetric algorithms such as 3DES and AES. Public key algorithms that may be supported include, for example, Diffie-Hellman, Digital Signature Algorithm ("DSA") and RSA. Discrete Logarithm Integrated Encryption Standard ("DLIES") algorithms also may be supported. Depending on the performance requirements of the system, these processing blocks may be implemented in hardware (e.g., one or more dedicated cryptographic processors) and/or using software executing on one or more processors.

The embodiment of FIG. 7 includes a public key acceleration engine ("PKE") 714. The PKE 714 may provide acceleration for algorithms such as the Diffie-Hellman algorithm, the RSA algorithm and/or the digital signature standard ("DSA") algorithm. The Diffie-Hellman public key algorithm may be used, for example, for key agreement in a number of protocols, including IKE, SSL and TLS. The RSA public key algorithm may be used, for example, for digital signature authentication and key exchange in IKE, SSL and TLS. The DSA algorithm may be used, for example, to sign and verify data. It also is widely used in a number of other applications such as Public Key Infrastructure ("PKI") products.

The PKE 714 may be used to accelerate the algorithms required for key agreement during the key session setup. In addition, the PKE 714 may be used to encrypt, decrypt, etc., asymmetric keys that are loaded into or out of the stateless module and to process certificates. In some embodiments the stateless module requires that all "secret" key material for the PKE messages be loaded from a key-encryption-key ("KEK") cache 724 for internal key operations.

The PKE 714 also may be used to encrypt, decrypt, sign, verify, etc., application data using asymmetric keys stored in, for example, an application key cache 704. For example, the PKE may be used by other components in the stateless module 700 or may be accessed by a host using public key acceleration commands supported by the stateless module 700. The public key acceleration commands may be used, for example, for application key acceleration. Thus, acceleration may be provided for cryptographic operations that involve the use of cleartext asymmetric keys. In some embodiments the host cannot directly access any of the functions provided in the PKE 714. Also, the stateless module 700 may require that all "secret" key material for the PKE messages be loaded from the application key cache 704 for user commands.

From the above, it should be appreciated that the symmetric, asymmetric and other cryptographic operations described herein may be performed with a security boundary associated within the stateless module 700. For example, all of these operations may be performed within the same chip.

The authentication block 710 in FIG. 7 may be used to provide the basic SHA-1 algorithm implementation. The result of a given operation may be a 160 bit digest. The initial value of the state registers for the SHA-1 algorithm may be programmed into digest register as the starting point for the authentication. Since the master controller 706 may have access to the intermediate state (digest) values, the FIPS186-2 'x' value generation and FIPS186-2 'k' value generation may be provided by the authentication block 710 in combination with the master controller 706. The TLS protocol requires that this block support SHA-1, HMAC-SHA-1, MD5 and HMAC-MD5 for key generation in the TLS handshake.

In some embodiments an encryption block 712 may comprise a triple DES (3DES) minimal gate count implementation. For example, it may incorporate a single cycle per round implementation to minimize gate count. The input of the encryption block 712 may be double buffered such that it can be loaded while operating on the previously loaded value. The output of the encryption block 712 may be implemented in the same manner such that the master controller 706 may load the next value and unload the previous values from the block 712 while the current value is being processed.

The single round implementation may provide both encryption and decryption of the CBC and ECB 3DES algorithm. The key may be provided via a key register (write only) that is written by the master controller 706. The key values may be transferred from the application key cache 704, the KEK key caches 724 or may be the result of a shared secret derivation prior to data operations. The encryption block 712 may be configured to protect the data operation such that the master controller 706 cannot change the key during a block encryption or decryption.

The key-encryption-key ("KEK") cache 724 is a separate memory block that may be sized based on the required number of KEKs in the system. Typically, it is large enough to hold a session private key and a single asymmetric group key.

In some embodiments the KEK Cache 724 is protected in hardware during the execution of any command that does not require a KEK key. For example, a signal from the global registers may be provided to the KEK cache to indicate that the command register is locked, is active and contains a command that requires a KEK. If this signal is active, access to the KEK cache is enabled for the master controller 706. For all other cases, the KEK may be locked.

Some KEK cache locations may be implemented in the NVM block 716. The long term keys may be formatted and accessed as any other key locations in the KEK cache from the external interface 720. Here, the same access controls of the KEK cache may be enforced on the NVM keys. The NVM key locations may use fixed values for 'g' and 'p' that are embedded in the master controller ROM 708.

The volatile key cache locations may be implemented as addressable memory (or register file) for the master controller to segment into key cache locations. The fixed (or NVM) elements are addressable as part of the NVM. Time based key checks may be performed by the master controller 706 before using the volatile key values.

In general, the performance, size and function of the blocks discussed above may be scaled to meet the demands of the system. For example, the basic cryptographic functions that implement the secure channel back to, for example, the HSM to transfer and process key material (and/or policy) may be provided at minimal processing performance levels.

The cryptographic accelerators contained within the stateless module 700 may be used for application data processing when they are not being used for key management functions. For example, a stateless module for an e-commerce application may be used to protect RSA private keys. Here, the amount of public key acceleration required for the secure channel is typically minimal (e.g., less than 10 operations/sec). Consequently, any spare processing capacity (e.g., idle cycles of a processor) may be used for other operations.

In contrast, the amount of public key acceleration required for a typical e-commerce accelerator is relatively high (e.g., greater than 500 operations/sec). Applications such as this may require the use of cryptographic accelerators that are specially designed to perform cryptographic operations at a high rate of speed.

The application key cache 704 may store key material that is used by external cryptographic acceleration processors. For example the cache 704 may store decrypted application keys (e.g., the RSA private key for an application executing on a device that incorporates the stateless module 700). The application key cache 704 may store both asymmetric key and symmetric key material.

The cryptographic accelerators may be attached directly to the stateless module via an application key cache interface 702. As represented by the corresponding input and output signal lines in FIG. 7, the interface 702 may support, for example, input signals such key select and key type. The requested key and associated information may then be provided to an accelerator via output signals of the interface 702.

In some embodiments the application key cache interface for the add-on cryptographic acceleration processing is maintained within a security boundary associated with the stateless module 700. For example, the stateless module 700 and the add-on cryptographic accelerators (not shown in FIG. 7) may be implemented on the same chip. In this manner, cleartext keys may never be allowed to leave the security boundary which also includes the key accelerator. However, the external application may use the key accelerator as it normally would by simply referencing the appropriate key (e.g., RSA private key) that is stored in the stateless module 700.

More than one cryptographic accelerator may be connected to the stateless module 700. For example, separate cryptographic accelerators may be used to provide symmetric and asymmetric key algorithm processing.

The application key cache 704 also may be used by the master controller 706. For example, application key cache 704 also may provide encryption and decryption storage for the internal acceleration cores such as the public key core 714 or the 3DES core 712.

The stateless module 700 may enforce key policy for keys used within the client that incorporates the stateless module. The key policy may be set by, for example, the HSM for all keys that are delivered to the stateless module. The key policy may indicate how the key is to be used by the stateless module.

In addition to usage policy, the stateless module may enforce a lifetime for keys. For example, the application key cache 704 may enforce key lifetime expiration for keys that are accessed via the stateless module commands or the application key cache interface. Typically, a key lifetime is a relative time from the time at which the key is loaded into the stateless module. The HSM may use multiple levels of key hierarchy and lifetime policy enforcement to ensure that keys are used properly and are revocable at the stateless module.

A security assurance logic block 728 protects the stateless module 700 from system security attacks. To this end, several system monitors may be coupled with the other components in the stateless module and/or the chip (and/or the system) within which the stateless module resides.

In some embodiments, protection circuits in the block 728 trigger a reset of the stateless module 700 when an attack is detected. This reset may wipe out all transient information in the stateless module. For example, all key cache locations may be cleared. An interrupt may be provided to the local host with information on which protection mechanism triggered the reset.

A low frequency protection circuit ensures that the operating frequency of the stateless module 700 does not fall below given threshold. For example, this circuit may ensure that the time tick register value can not be compromised within the limit of a reference frequency. In some embodiments the time tick register is protected to an accuracy of 16/5 or approximately 3× accuracy such that a key could never be used for more than 3 times the designated amount of time in the key policy. In some embodiments slowing down the clock of the key time register will slow down the clock of the device (accelerator component) that is using the key. In this case, the key will not unnecessarily be more useful.

In addition to protecting the time tick value, the low frequency protection circuit may make it more difficult to implement successful dynamic attacks that attempt to read values within the stateless module 700 while it is operating. In this case, the higher the threshold value, the better protection that is provided.

In some embodiments the stateless module 700 may require two instantiations of the low frequency monitor. One instantiation is for the reference clock used for the time tick protection. A second instantiation is for the core clock.

An operating point protection circuit may be provided to ensure that all logic within the stateless module 700 operates as designed for all process, voltage and temperature conditions (or across all operating points). The protection circuit helps ensure that an attacker cannot change the operating point such that a timing path is violated in the stateless module.

A watchdog timer block may be used during processing to ensure that command execution completes within an expected period of time. The timer may be set by the master controller 706 whenever a command (or sub-command such as a public key operation) is started. The set time is based on the expected maximum command length. If the watchdog timer reaches zero a reset is issued to the stateless module 700. In general, the watchdog timer cannot be turned off and must be written periodically by the master controller to avoid clearing the stateless module. However, the watchdog timer may be frozen when the stateless module is taking command input from the host.

A reset monitor provides protection against multiple reset attacks. The reset monitor uses a timer based on the time tick register increment that requires at least one tick before allowing more than, for example, sixteen resets to occur. If more than sixteen resets occur within the time tick, the stateless module 700 will require at least two time ticks before releasing the sixteenth reset.

The reset protection is disabled until the NVM 716 has been properly programmed. For example, is may be disabled during manufacturing tests.

A hardware protection mechanism may be provided for entering and exiting a secure state while the stateless module 700 transitions between enabling/disabling the external interface 720. The stateless module 700 boots to a secure state with the external interface disabled. For example, the interface may be locked out by hardware. Once reset processing and self-tests have completed, the master controller 706 sequences through a series of commands to exit the secure state and enter a USER state. In some embodiments these commands require execution of a predefined set of sequential instructions be written to non-sequential addresses.

The hardware tracks the number of clocks it takes to execute each step of the sequence and ensures that these commands occur in the required order to the required address at exactly the right clock cycle. After the exit logic has completed, the mode may be set via hardware to USER mode. In USER mode, the hardware locks out master controller access to all of the internal blocks except the data buffer and the data input/output registers (only blocks that are required to move data into the device).

Once the command has been moved into the data buffer, the master controller 706 sequences a series of commands to return to the secure state. This sequence may again be tracked and enforced via the hardware block to enter into secure mode. It also may ensure via hardware that the master controller enters the secure mode with the proper entry address.

The master controller ROM 708 may be programmed using an extra bit to indicate which instructions are valid code entry and code exit points. The instruction code entry/exit points may be enforced in hardware whenever the master controller 706 takes a non-sequential code fetch. This mechanism helps to ensure that it will be difficult for an attacker to get the master controller to bypass certain portions of code. As a result, it may be virtually impossible to successfully attack the stateless module 700 by causing random jumps in the program execution.

Figure 8:
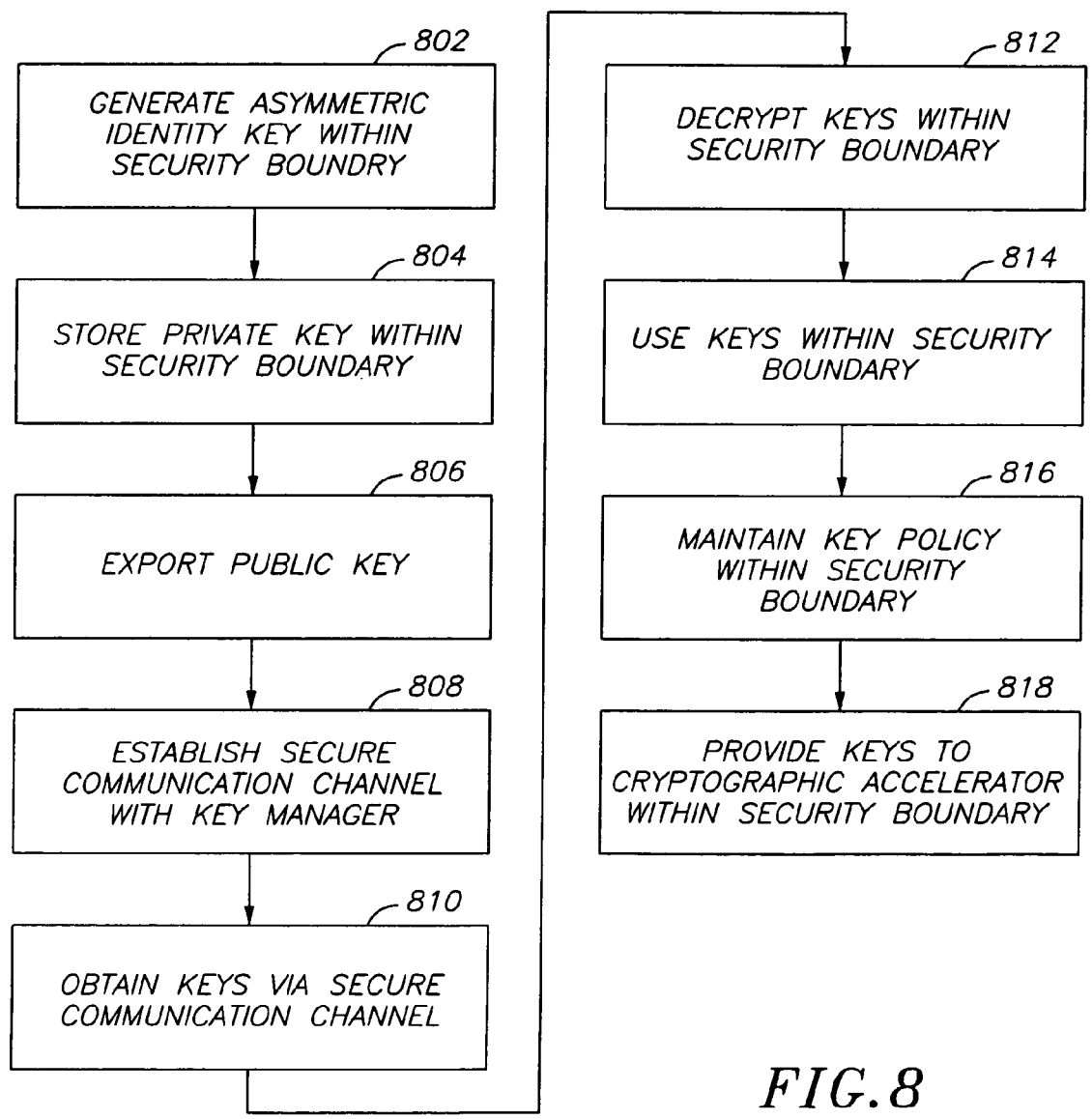
FIG. 8 is a flow chart of one embodiment of operations that may be performed in accordance with the invention.

Referring now to FIG. 8, an example of operations that may be performed by one embodiment of a stateless module will be discussed. As represented by block 802, when the stateless module is initialized for the first time after manufacture (e.g., during final test of the chip) it generates a public-private key pair. For example, the master controller may cause a random number generator (e.g., RNG 718) to generate a random number that is provided as a seed to a cryptographic processor that generates the key pair.

The master controller stores the private (identity) key in a nonvolatile memory (e.g., NVM 716) and never exports this key outside of the security boundary of the module (block 804). For example, in some embodiments the key never leaves the chip within which the stateless module resides. In some embodiments, this key is encrypted before being stored in off-chip non-volatile memory.

The stateless module also stores the corresponding public key and, upon request, exports the public key (block 806) so that the device manufacturer (or some other trusted entity) may publish the public key along with a certificate to a public server.

The stateless module may then be deployed in a computing device that can connect to another device (e.g., a key manager) via a network or some other link. As represented by block 808, the stateless module may use its private key to establish a secure communication channel with, for example, a key manager that has access to the public key of the stateless modules.

As represented by block 810 the key manager may send keys to the stateless module via the secure communication channel. For example, the key manager and stateless module may negotiate to obtain additional keys that may be used to provide secure communications between the two components. In addition, the key manager may send keys to a remote client via the stateless module. For example, the key manager may generate a private session key (Ka-priv) for a client that incorporates the stateless module. As discussed above, the key manager may encrypt this key using the stateless module's public key (Kdc-pub) or some negotiated key before sending it to the client.

As represented by block 812, the keys are decrypted within the security boundary associated with the stateless module. For example, cryptographic processors in the stateless module may decrypt these keys. Alternatively, another cryptographic processor (e.g., located on the same chip as the stateless module) may decrypt the keys.

As represented by block 814, the stateless module may then use the keys within the security boundary. For example, cryptographic processors in the stateless module may use these keys to decrypt other keys (e.g., session keys). In addition, the stateless module may enforce key policy within the security boundary (block 816).

In some embodiments, as represented by block 818, the stateless module may provide keys to one or more cryptographic accelerators within the security boundary. For example, the cryptographic accelerators may be located on the same chip as the stateless module.

In many applications, it is desirable to provide as small of a footprint (e.g., die space) as possible for the security functions. For example, some applications require that a device be as small as possible. Other applications may attempt to reduce system cost by incorporating as much functionality as possible into a single chip. A variety of techniques may be employed to reduce the size of a stateless module as taught herein.

In some embodiments, to reduce cost and die space a stateless module may not handle processing related to communication protocols. Instead, the requirements of communication protocols may be handled by an associated device driver (or integrated processor).

Figure 9:
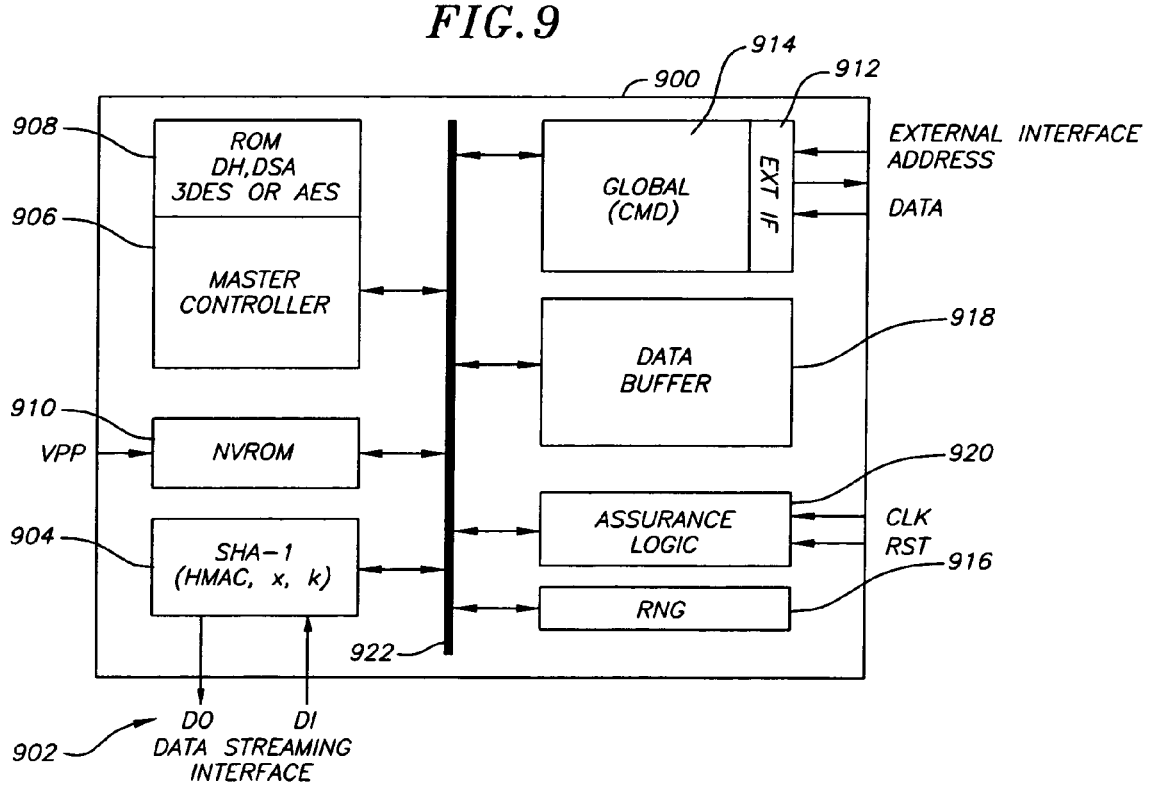
FIG. 9 is a simplified block diagram of one embodiment of a stateless hardware security module constructed in accordance with the invention.

Referring now to FIG. 9, one embodiment of a stateless secure link module 900 will be discussed in detail. This embodiment includes, in general, a subset of the functionality of the embodiment of FIG. 7. In particular, this embodiment only provides data encryption, decryption, etc. using a symmetric key. One advantage of this configuration is that it may be implemented in other devices with minimal impact on the cost and the size of the devices. Accordingly, this configuration may be used, for example, to economically secure an input link to a key management client.

In a typical application the embodiment of FIG. 9 is used to take data that originates from an input device and securely provide that data to a recipient device that uses the data. This process may involve encrypting the data so it is not transmitted in cleartext and/or may involve signing the data to certify to the recipient device that the data originated from a specific input device.

For example, the stateless module 900 may be integrated into a chip for a sensor (e.g., a biometric sensor such as a fingerprint reader). Here, the stateless module may be used to sign and/or encrypt the information generated by the sensor. The stateless module may then securely send the information to a recipient device that uses the information. In this example, the recipient device may use a fingerprint comparison as a means to control access to data or a service.

Here, the stateless module need not handle certificates or perform related processing because the data is ultimately processed by an entity (e.g., a server, etc.) other than the stateless module. For example, the input device may not need to verify whether the data is being sent to a specific recipient device.

In some embodiments the sensor data is always maintained within a security boundary. For example, by incorporating the stateless module into the sensor chip, the information may not be passed outside of the hardware boundary of the sensor chip in an unencrypted form. In addition, the stateless module may establish a secure channel with the recipient device through a symmetric key exchange. In this way, the information may be securely sent to the recipient device over otherwise insecure transmission media. Also, the recipient device may be secured in a conventional manner or using techniques as described herein.

As an example of the latter scenario, the recipient device may include a stateless module as described above in conjunction with FIG. 7. In this case, the recipient device may use other keys to, for example, securely send the information to a remote system. One example of such a remote system is a network access device that enables access to a network based on the user's credentials. In the example referred to above, these credentials may take the form of a user's fingerprint.

In other embodiments, it may only be necessary to establish that the data originated from a specific input device. For example, the system may make other provisions to ensure that a copied fingerprint data stream is not being replayed at a later time. In this case, it may be unnecessary to encrypt the information. All that may be needed here is an assurance that the information is being sent by a specific sensor. In this case, adequate security may be provided by cryptographically signing the data.

To provide a solution that is cost effective for a variety of input devices, the stateless module of FIG. 9 has a reduced set of functionality as compared to, for example, the embodiment of FIG. 7. The stateless module 900 includes a master controller 906, associated ROM 908, global registers (e.g., command registers) 914, a data buffer 918 and a data bus 922 to provide command processing, inter-module communications and support general operations.

The stateless module 900 also provides mechanisms generate keys and to obtain keys from, for example, a key manager. Accordingly, the stateless module 900 includes an external interface 912 to enable the asymmetric key operations that may be performed when a secure link is initially established with, for example, a key manager. In addition, the stateless module 900 includes circuitry that performs cryptographic operations, a random number generator 916 and non-volatile ROM ("NVROM") 910 to support generating keys and verifying the validity of keys. In addition, the stateless module 900 may include assurance logic 920 similar to that discussed above (or a subset of such assurance logic).

However, because the stateless module 900 may only use a single symmetric key, much of the functionality depicted in FIG. 7 is not provided in the embodiment of FIG. 9. For example, the stateless module 900 may not need to provide management capabilities (e.g., enforcement of key policy) and data storage (e.g., application key cache) for extra keys. Also, the NVROM 910 (e.g., OTP memory) may be smaller since it may only store, for example, an identity key and a symmetric key.

Moreover, as the stateless module 900 may only perform symmetric cryptographic processing on data from a data streaming interface, some or all of the dedicated cryptographic processors shown in FIG. 7 (e.g., the public key processing and 3DES) may not be needed. For example, the stateless module 900 may only perform the asymmetric key operations once after it boots up. These asymmetric operations may be used, for example, to obtain a symmetric key or keys that are used to perform cryptographic operations. In addition, as discussed above the stateless module 900 may not need to verify the authenticity of the recipient of the data. Accordingly, the remaining cryptographic processing operations may be performed by the master controller 906. In this case, the application code for one or more cryptographic algorithms (e.g., DH, DSA, 3DES and AES) may be stored in a ROM 908.

The embodiment shown in FIG. 9 may secure an incoming data stream (DI) on a data interface 902 by signing it using the SHA-1 algorithm. Accordingly, a separate processing block 904 may be provided for this operation. The signed output of this processing block provides a data stream (DO) that is sent to the recipient device via the data interface 902. In an embodiment that also encrypts or decrypts the data stream flowing through the data interface 902, a dedicated processing block (not shown) may be provided to implement, for example, a symmetric encryption algorithm.

Figure 10:
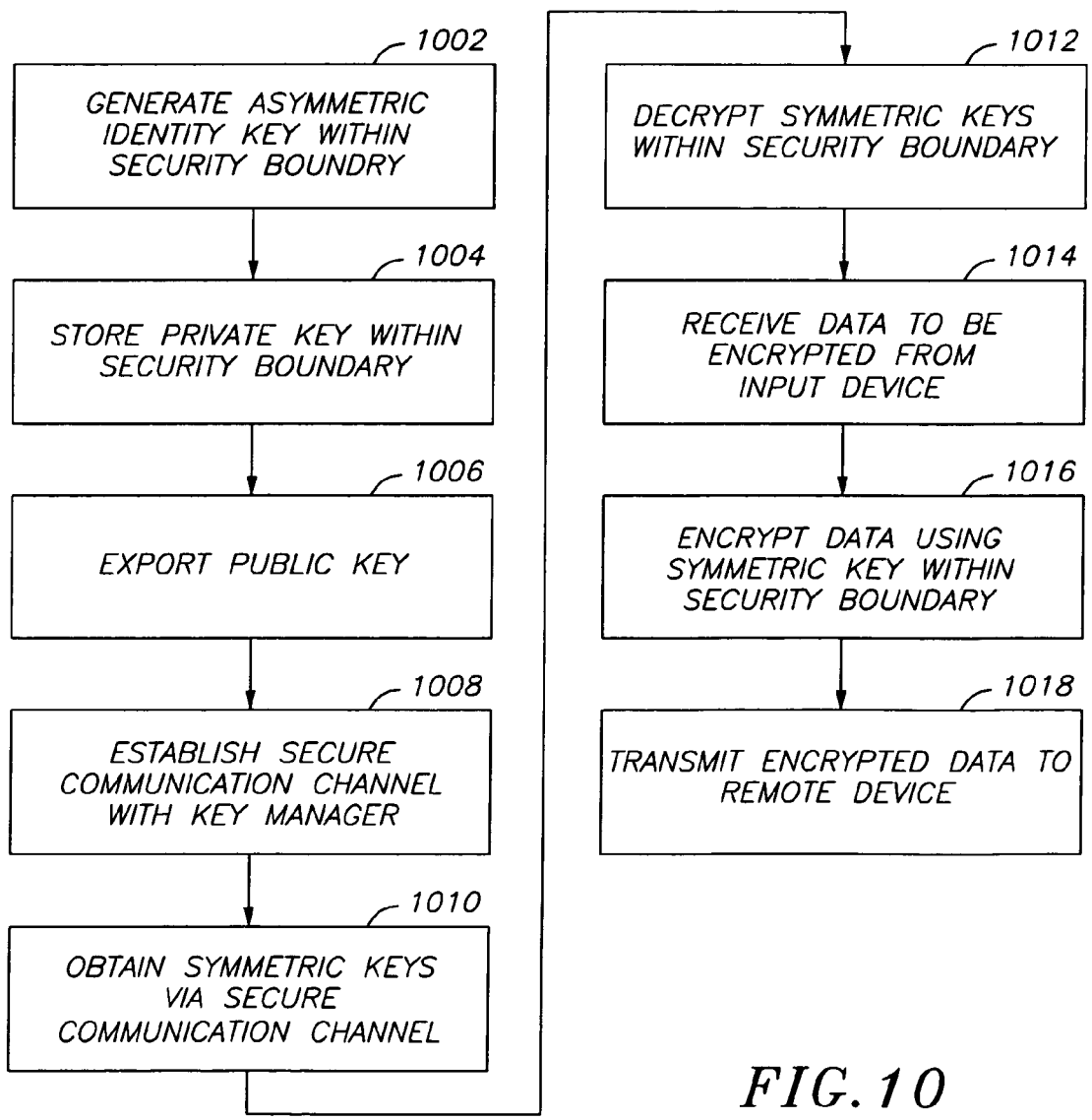
FIG. 10 is a flow chart of one embodiment of operations that may be performed in accordance with the invention.

Referring now to FIG. 10, an example of operations that may be performed by one embodiment of a stateless secure link module (e.g., stateless module 900) will be discussed. As represented by blocks 1002-1010, stateless secure link module generates a public-private key pair, stores the private (identity) key in nonvolatile memory within the security boundary, exports the public key and establishes a secure communication channel with, for example, a key manager. These operations may be similar to those discussed above in conjunction with FIG. 8.

As represented by block 1010 the key manager may send one or more keys to the stateless secure link module via the secure communication channel. For example, the key manager may send symmetric keys that are used to encrypt and/or sign data that the stateless secure link module receives from an input device. As represented by block 1012, cryptographic processors (or other processing) may decrypt these keys within the security boundary associated with the stateless secure link module.

As represented by block 1014, the stateless secure link module may receive data to be cryptographically processed (e.g., encrypted, signed, etc.) from an input device. As discussed above the input device may be, for example, a biometric sensor, a sensor for a camera, etc. or any other device that needs data to be authenticated or securely transmitted to another (e.g., remote) device.

As represented by blocks 1016, the stateless secure link module uses the symmetric keys within the security boundary to process (e.g., encrypt) the data. Then, as represented by block 1018, the stateless secure link module sends the processed data to the remote device.

Figure 11:
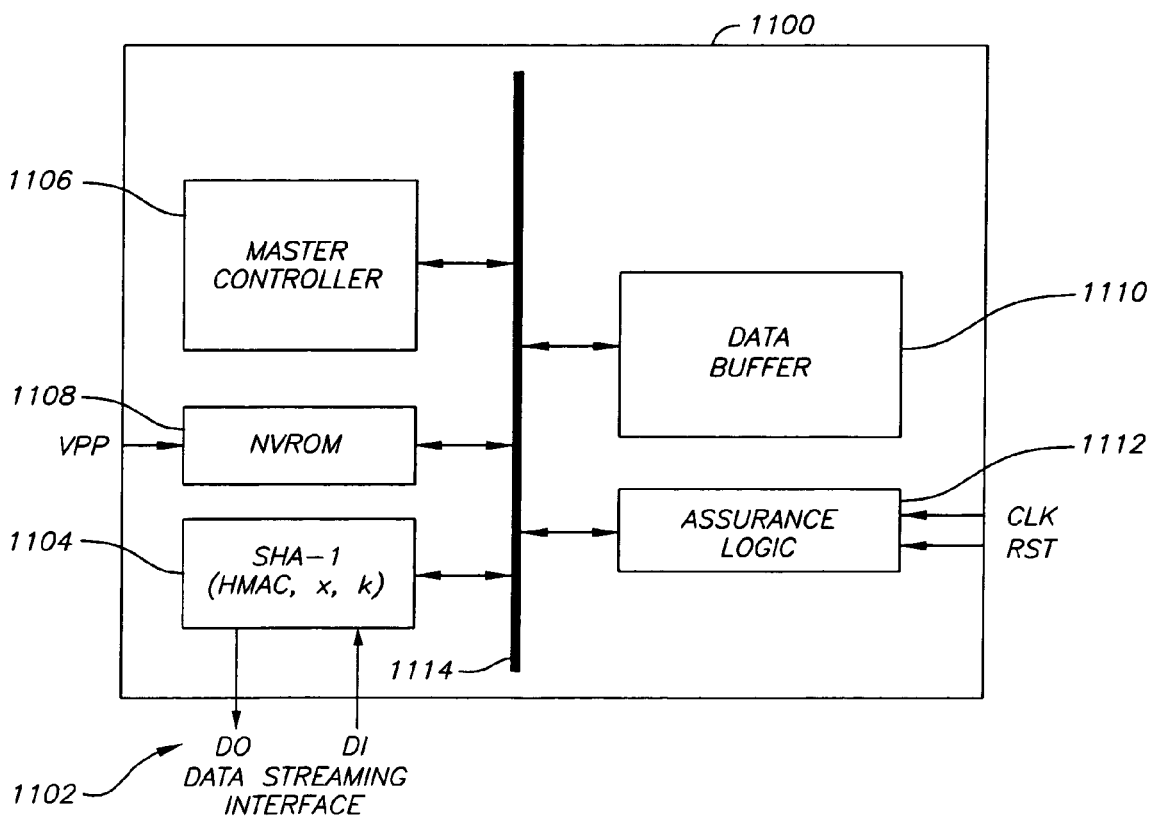
FIG. 11 is a simplified block diagram of one embodiment of a stateless hardware security module constructed in accordance with the invention.

In some embodiments, one or more long-term symmetric keys may be injected into the stateless secure link module during manufacture (e.g., during chip test). In this case, the stateless module may not need to interface with a head-end server (e.g., key manager). As a result, the external interface 912, the RNG 916 and the asymmetric key processing circuitry shown in FIG. 9 may not be needed. Accordingly, as illustrated in FIG. 11 a simplified stateless secure link module 1100 may include a relatively small master controller 1106 for injecting the symmetric key and performing other basic operations, a nonvolatile memory 1108, a data buffer memory 1110, one or more cryptographic processors 1104 for the symmetric key operations and, optionally, assurance logic 1112.

Such an embodiment may be used, for example, in a component that includes the input device for the data and the recipient device for the data. For example, the input device may reside in the same enclosure (or may reside on the same circuit board) as the recipient device, yet some level of security may still be desired for data transfers between these devices. In this case, however, the fixed proximity of the input and recipient devices may provide an additional level of security that reduces the need to use more than one symmetric key during the lifetime of the component.

Figure 12:
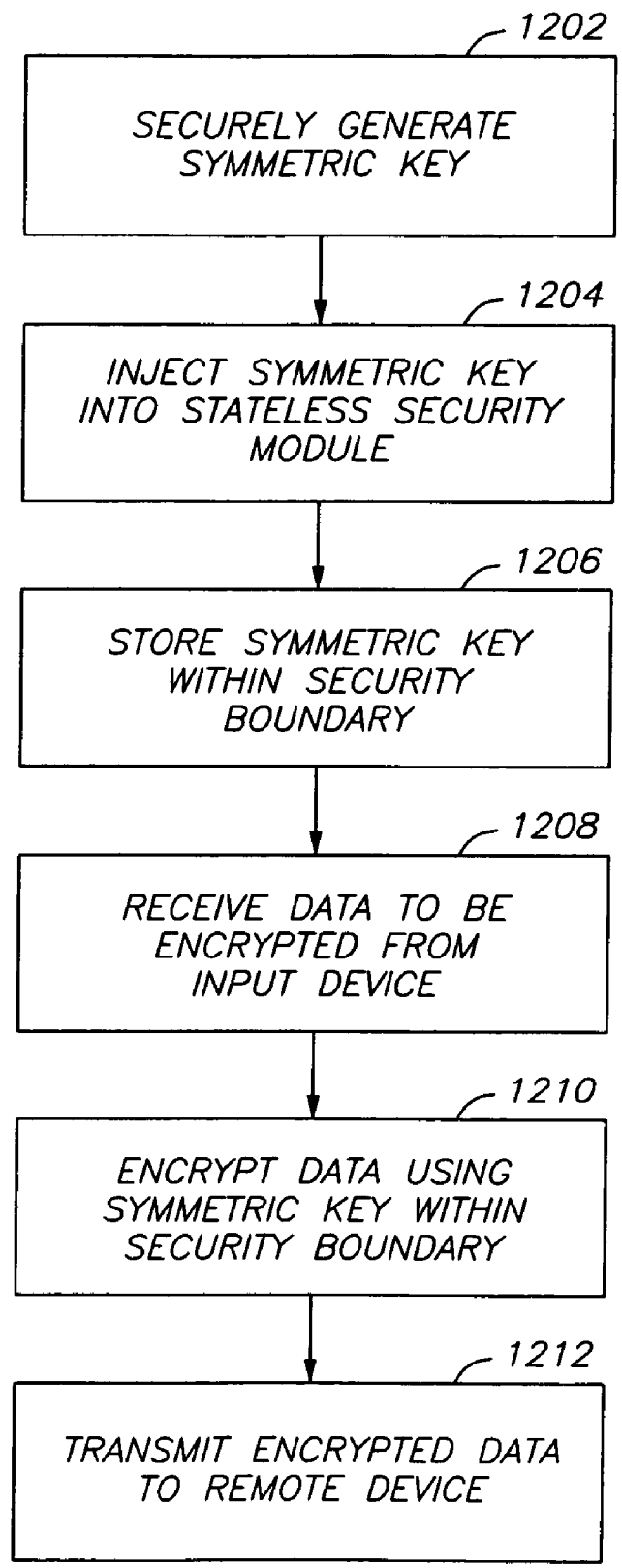
FIG. 12 is a flow chart of one embodiment of operations that may be performed in accordance with the invention.

Referring now to FIG. 12, an example of operations that may be performed by one embodiment of a stateless secure link module (e.g., stateless module 1100) will be discussed. As represented by block 1202 a key (e.g., a symmetric key) for the stateless module is generated in a secure manner. For example, the key may be generated in an HSM that is located in a secured location in the device manufacturer's or OEM's facility. Alternatively, the key may be generated within a protected key manager such as a trusted platform module ("TPM").

The symmetric key is then injected into the stateless module (block 1204). Again, this may be done in a secure environment. For example, the chip may be moved to the secure environment referred to above for this step. Alternatively, the key may be sent from a protected key manager (e.g., a TPM) via a direct connection. As an example, when the stateless module is located on the same device as the TPM, a link that cannot be compromised by software attacks may be provided between these two components. Typically, this may involve not routing the data through the software stack, not storing the data in memory that is accessible by software or not routing the data over a bus that may be readily monitored. As represented by block 1206 the stateless module maintains the symmetric key within its security boundary.

As represented by block 1208-1212, the stateless module may then receive data to be cryptographically processed (e.g., encrypted, signed, etc.) from an input device, use the symmetric key within the security boundary to process (e.g., encrypt) the data and send the processed data to a remote device.

Figure 13:
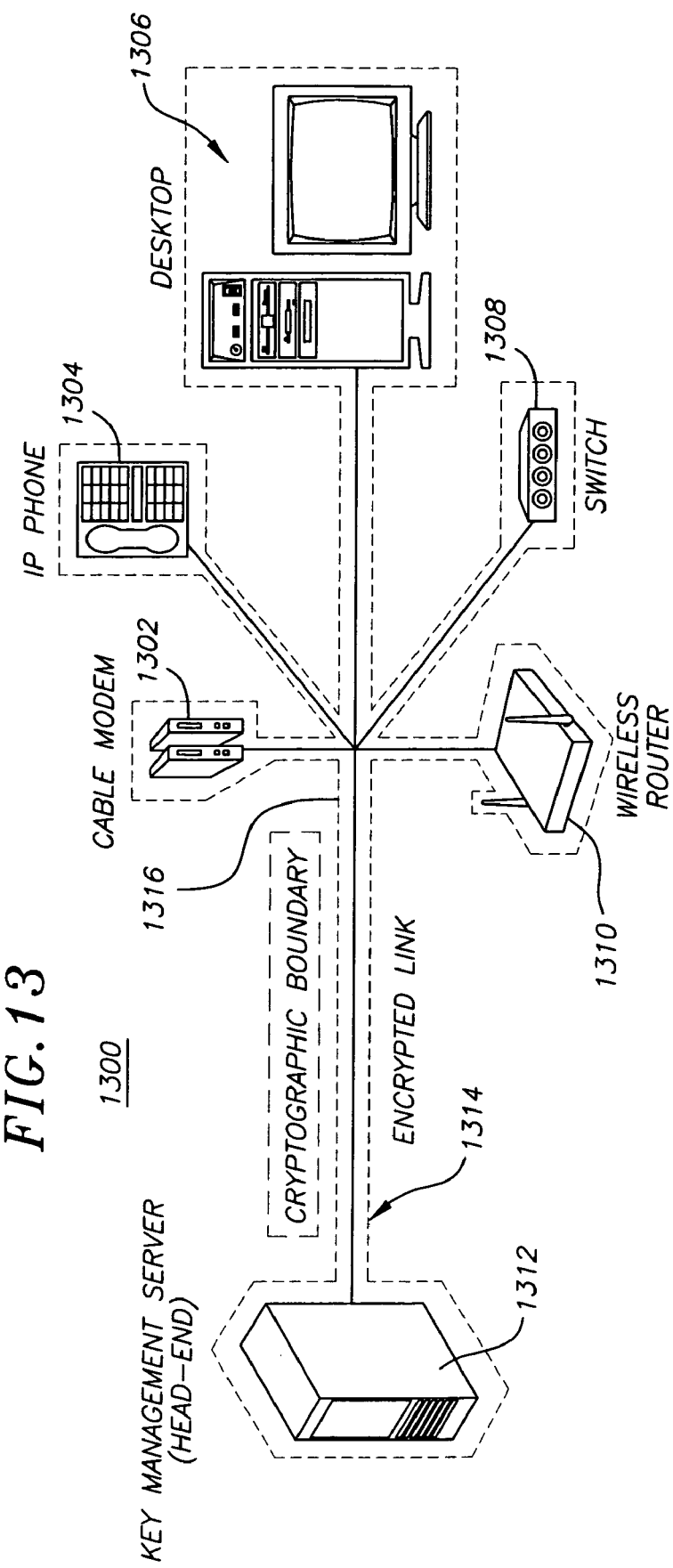
FIG. 13 is a simplified diagram of one embodiment of a security system constructed in accordance with the invention.

FIG. 13 illustrates one embodiment of a key management system 1300 that incorporates various clients. As shown in FIG. 13 these clients may include, for example, cable modems 1302, internet protocol ("IP") phones 1304, computers 1306, switches 1308, wireless routers 1310 and/or network interface cards ("NICs").

In some embodiments cryptographic processing may be integrated into these clients. For example, media encryption may be integrated into IP phones and media gateways to prevent sniffing and/or eavesdropping of voice and signaling packets. Accordingly, a client device may include hardware acceleration (and/or software processing) to perform one ore more encryption algorithms such as DES, 3DES, AES, RC4, RC5, etc.

As discussed herein a key management server 1312 located at a head-end may manage a client via an encrypted link 1314. In this way a cryptographic boundary 1316 may be established between the server 1312 and the clients 1302-1310. This enables key material and other sensitive information to be transferred over an insecure communication medium (i.e. network and/or Internet) between the server 1312 and the clients 1302-1310.

In some embodiments the system includes a key management server that resides at the head-end; key management software that directs and manages the clients; and a low-cost silicon-based security module that is resident in the client devices to protect key material from being exposed. Here, the security module may comprise a stateless security module as discussed herein.

In addition, as discussed above a factory-installed identity may be stored securely within each client device. Once a client has an identity, a security system may be built around it through a management server that has, for example, a hardware security module installed in it. Since the client device has an identity stored in hardware, the client device may be managed remotely.

In a voice-over-IP ("VoIP") system, servers, media gateways, gatekeepers and IP voice terminals (e.g., telephones) may be susceptible to security breaches such as access control, data control, disruption and eavesdropping. Accordingly, IP telephones and these other devices may incorporate hardware security functions such as AES media encryption to prevent voice and signaling sniffing and eavesdropping and denial of service software to maintain acceptable quality-of-service levels if phones become targets of attacks. To this end, in some embodiments a security module may be incorporated into each of these devices. In addition, these devices may incorporate one-time-programmable identification cells (memory) as discussed herein to make device identification and configuration more advanced and easier to manage.

By providing cryptographic capabilities and security management techniques as discussed herein into these devices, security breaches may be reduced or avoided. Accordingly, an IT manager may be better able to manage clients securely and efficiently and protect the system against security breaches such as network attacks.

Figure 14:
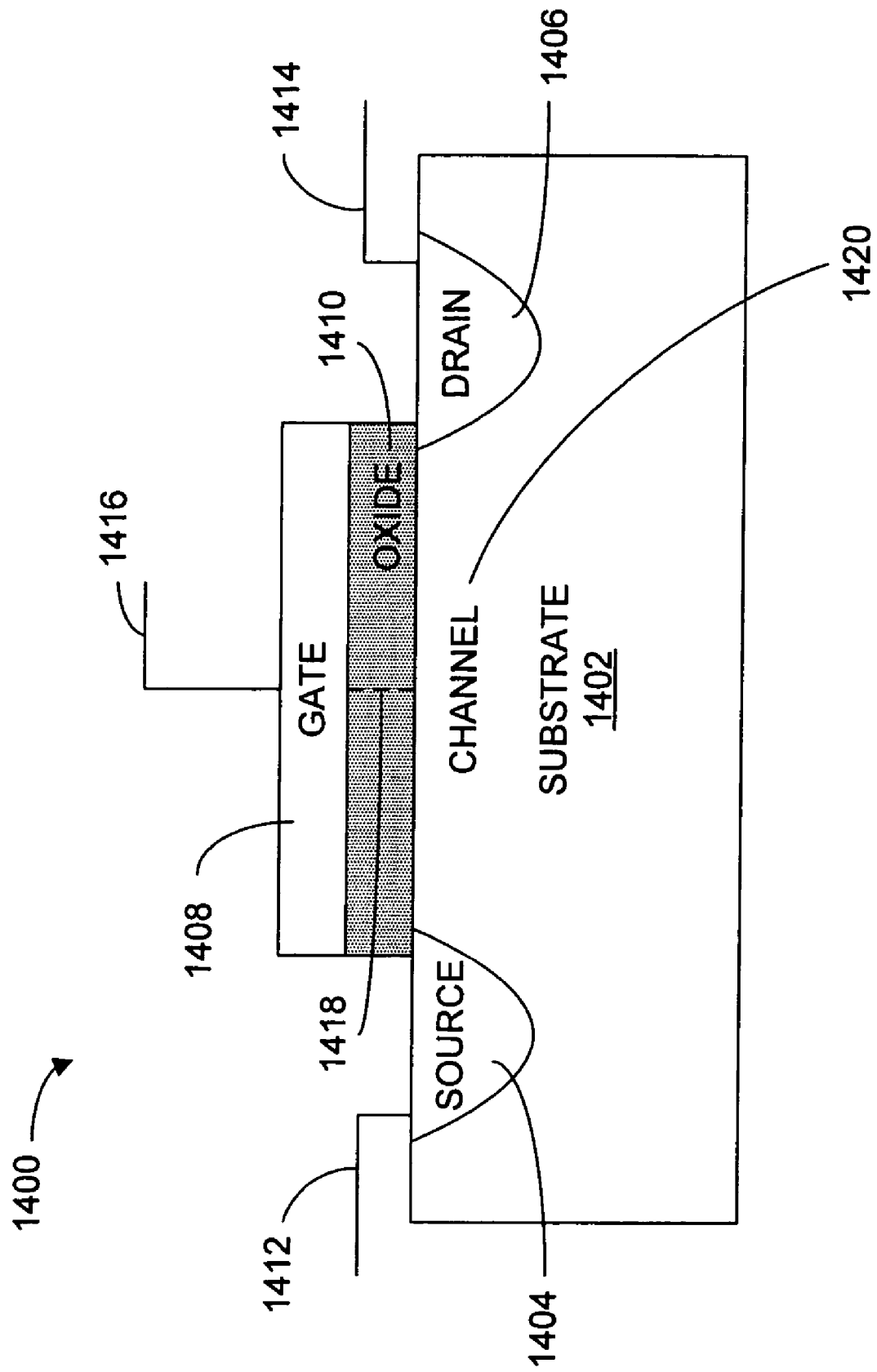
FIG. 14 is a simplified diagram of one embodiment of a gate-oxide fuse constructed in accordance with the invention.
Figure 15:
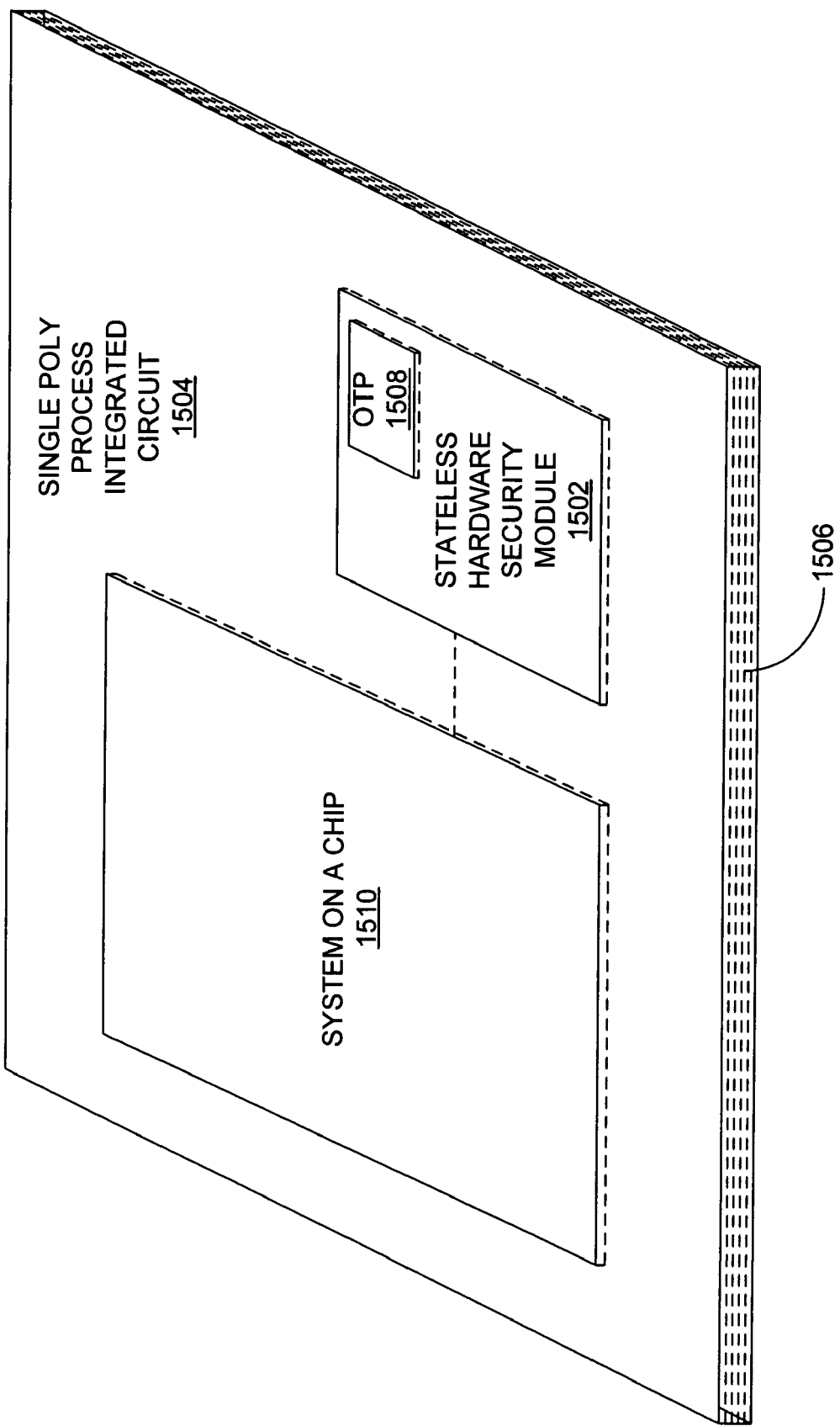
FIG. 15 is a simplified diagram of one embodiment of an integrated circuit constructed in accordance with the invention.

Referring now to FIGS. 14 and 15, in one aspect of the invention a stateless security module may be advantageously implemented using any type of MOSFET process (e.g., CMOS process). For example, a stateless security module may be implemented using a single poly process, a double poly process, a specialized memory process, an analog process, etc. In some embodiments the ability to use any process results from the unique architecture of a stateless security module and/or the use of an improved type of one-time programmable memory.

As to the unique architecture, since the security module is stateless, the security module may not require the use of any re-writable non-volatile memory ("NVM") to store state information. As discussed above, conventional hardware security modules must store state information relating to, for example, keys that are generated or maintained by the module. As a result, these security modules utilize re-writable NVM such as EEPROM, flash memory, etc., to reliably store this state information.

Due to the methods used to implement a memory element in a re-writable NVM, the use of such a memory in a system may adversely affect the cost or other aspects of a system. For example, an EEPROM is implemented in an integrated circuit using a specialized EEPROM process. Similarly, a flash memory is implemented using a specialized flash-capable process. Processes such as these are not compatible with single poly processes because, for example, a double poly process or other process is needed to implement the capacitive memory elements used in such memories. For example, some memories may use a double poly process to implement back-to-back capacitors for the memory elements.

In contrast, in many systems the majority of the components may be manufactured using a relatively standard process (e.g., a high volume process that may be, consequently, less expensive) such as a single poly process. Hence, a system that incorporates these types of components and re-writable NVM may either use two integrated circuits, one for the components and one for the memory, or may incorporate the components and the re-writable NVM into the same integrated circuit. Both of these approaches have significant drawbacks.

The use of separate integrated circuits increases the size and cost of the system. Moreover, this approach presents problems relating to the transfer of sensitive data (e.g., key material) between cryptographic processors and the data memory. To protect the sensitive data in such memories the memories may need to be physically protected by the enclosure of the hardware security module. Alternatively, the processors must encrypt everything that is stored in the data memory. This, however, would require the use of other keys that are securely generated, maintained and stored. A resolution to such problems, if they are resolvable at all for a given application, may adversely affect the ultimate cost and reliability of the system.

The second approach also increases the cost of the system. For example, in some applications both the components and the memories may be implemented using the specialized process that is required to implement the memories. Alternatively, multiple processes (e.g., the standard process and the specialized process) may be used to implement the components and memories on the same integrated circuit. In either case, the efficiencies associated with only using the standard process are lost.

From the above, it should be appreciated that the constraints associated with using a re-writable NVM may be avoided in a stateless security module. As discussed herein, however, a stateless security may incorporate an OTP memory. Nevertheless, a stateless security module be implemented using a standard (or any) process through the use of an improved type of OTP memory that may be implemented using a standard (or any) process.

In some embodiments such an OTP memory may include an array of memory cells each of which comprises a storage element adapted to store data. In addition, each memory cell may comprise at least one thin gate-oxide fuse that is coupled to the storage element and is adapted to set a state of the memory cell. Here, the state of a memory cell may be altered by blowing a fuse associated with the memory cell. Significantly, this process may be implemented using a standard process such as a single poly process, yet provide a very reliable and robust storage element.

FIG. 14 illustrates one embodiment of a thin gate-oxide fuse 1400 constructed from a MOS transistor. The fuse 400 comprises a substrate 1402 including source and a drain regions 1404 and 1406. A channel region 1420 is defined between the source region 1404 and the drain region 1406 in the substrate 1402. A gate 1408 (e.g., comprising polysilicon) is insulated from the channel region 1420 by a layer of dielectric material such as silicon dioxide 1410. For convenience, the dielectric layer 1410 may be referred to herein as the gate-oxide. It should be appreciated, however, that the term gate-oxide may refer to any type of material that provides the desired insulating and tunneling properties discussed herein.

In some embodiments leads 1412 and 1414 from the source and drain regions 1404 and 1406 are coupled together. In this way the transistor of FIG. 14 may function as a capacitor in its original (not blown) state.

The gate-oxide fuse transistor 1400 may be programmed by applying controlled pulses of electrical current having predetermined amplitude across the gate-oxide 1410. For example, the leads 1412 and 1414 of the drain and source regions 1404 and 1406 may be connected to ground and a programming voltage applied to the gate lead 1416.

Pulses of sufficient magnitude and duration are applied to the gate-oxide so as to rupture the gate-oxide without creating a void in the gate-oxide. That is, the application of the appropriate voltage signal across the gate-oxide causes a direct gate tunneling current (e.g., as represented by line 1418) to flow through the gate-oxide such that the gate-oxide is ruptured. This direct gate tunneling current is in contrast with the Fowler-Nordheim tunneling that occurs in conventional CMOS devices. Accordingly, the thickness and characteristics of the gate-oxide are such that it is capable of passing a direct gate tunneling current. In some embodiments such a thin gate-oxide fuse has a gate-oxide with a thickness of about 2.5 nm or less. An appropriate gate-oxide thickness may be provided, for example, by a 0.13µ CMOS process, a 0.18µ CMOS process or other processes.

When the gate-oxide 1410 is blown, a conductive path (e.g., as represented in part by line 1418) is formed between the gate 1408 and the source and drain regions 1404 and 1406 through the channel 1420. For example, a conductive path may be formed in the gate-oxide 1410 by diffusion of silicon from the substrate 1402 or polysilicon gate material. In some embodiments this resistance, under controlled electrical pulses, may be on the order of hundreds of ohms or less. Significantly, this resistance may be on the order of four orders of magnitude lower than the resistance between the gate and the source/drain prior to programming.

In some embodiments the fuse 1400 includes a deep well such as an N-well in a P substrate (not shown). An advantage of the deep well is that it may enable a sufficiently high voltage to be applied across the gate-oxide using standard integrated circuit power supply voltage(s). Here, the deep well may serve to isolate the memory cell, enabling biasing the well, source and drain to about −3.5 volts. During a write operation about 2.5 volts for example may be applied to the gate through the lead 1416, thus effectively creating less than about a 6 volt voltage difference across the gate-oxide 1410 to rupture it. In one embodiment about a 5 volt voltage difference is created across the gate-oxide to rupture it.

In some embodiments a gate and gate-oxide are formed on the channel and lightly doped source and drain extension regions are formed in the channel. The lightly doped source and drain regions extend across the channel from the source and the drain regions, respectively, occupying a substantial portion of the channel (not shown). Through the use of this process, the gate-oxide may be ruptured in a more effective manner.

In some embodiments the OTP memory includes CMOS memory cells each of which comprises a storage element adapted to store a state and two gated fuses that are coupled to the storage element and are adapted to set the state of the memory cell. A level shifter may be connected to the gated fuses to stand off a high voltage when setting the state of the memory cell. At least one switch transistor may be connected to at least the level shifter to select at least one of the gated fuses, enabling a high voltage to be communicated thereto, thus setting the state of the memory cell. A programming device may be coupled to the storage element to keep at least one of the gated fuses low when setting the state of the memory cell. In this way, a fuse may be protected from being unintentionally blown.

Through the use of the above processes the rupturing of the gate-oxide may be more controlled and the final programmed resistance may be much lower as compared to conventional memory devices that incorporate poly fuses. Moreover, these processes may provide a smaller variance on programmed resistance which may enable the use of a more compact circuit to determine the state of the memory cell. In some embodiments differential circuits may be used to read the state of a memory cell. For example, in some embodiments a differential circuit may be used to sense the difference between a transistor that has been broken down permanently (e.g., by blowing the gate-oxide) and one that has not been broken down. In this way, very reliable indications as to the state of a cell may be provided.

Moreover, as discussed above a lower voltage (e.g., in some embodiments on the order of 5.0 to 6.5 volts) may be sufficient to rupture the gate-oxide of the gate-ox fuse. This may eliminate the need for charge pump circuitry as used in conventional devices to blow a fuse. This feature thus provides for a simpler memory cell array design and results in a smaller circuit.

Also, the process described above may provide advantages over conventional OTP processes. For example, conventional processes may use traces of poly or metal to provide a fuse structure. Such fuse structures require a relatively high current to blow the fuse. As a result, more complex circuitry is needed for generating the required levels of current. Moreover, since the process described herein does not use large amounts of current to blow a fuse and different structural breakdowns are involved in blowing a fuse, the process described herein may provide a more reliable fuse blowing mechanism.

Furthermore, using the gate-oxide fuse techniques the values programmed into the memory cells may be difficult or impossible to alter or decode without destroying the circuitry. For example, it may be difficult to inspect which fuse has been popped without damaging the fuses that are being inspected. In other words, an attempt to inspect the state of a fuse may alter the fuse to the extent that it is not possible to determine the original state of the fuse. In contrast, it may be easier to detect the state of the poly/metal fuse structure described above. For example, the blown traces may provide more physical evidence of a blown fuse. Moreover, the blown traces are typically in higher layers (e.g., the poly layer and the metal layer) than the gate-oxide in the integrated circuit. As a result, the poly/metal fuses may be more easily inspected since they are not as deep in the silicon as the gate-oxide fuses. In summary, the use of the gate-oxide techniques may provide a more secure mechanism for storing sensitive information such as key material as compared to conventional techniques.

Examples of architectures and implementations of OTP memory that may be advantageously implemented using standard and other processes are described, for example, in U.S. Pat. Nos. 6,525,955, 6,700,176, 6,704,236 and 6,693,819 and U.S. patent application Ser. No. 09/739,752, filed Dec. 20, 2000, the disclosure of each of which is hereby incorporated by reference herein.

In view of the above, a stateless module 1502 as shown in FIG. 15 may implemented in an integrated circuit 1504 that is made using a standard process such as single poly CMOS (as represented by process layers 1506) or another type of process. FIG. 15 illustrates one embodiment where the stateless module 1502 incorporates an OTP memory 1508. Alternatively, the OTP memory 1508 may be separately implemented within the integrated circuit 1504. FIG. 15 also illustrates an embodiment where the stateless module 1502 is incorporated into an integrated circuit with other components. For example, the other components may comprise a system on a chip 1510 or other circuits that provide functionality that may be advantageously implemented on the same integrated circuit as the stateless module 1502.

From the above it should be appreciated that when an OTP memory and stateless module combination may be implemented using any process (including a standard process), the stateless module may be integrated into a variety of conventional chips that are used in end-user and other devices. Moreover, the OTP and stateless module combination may be implemented using the process that is the most cost effective. For example, the OTP and stateless module combination may be implemented using any process that is required by or desirable to use for the other components (e.g., the system on a chip 1510). Such a combination may provide a very cost effective security solution.

In summary, through the use of the techniques described above, a stateless module constructed in accordance with the invention may provide a high level of security at a relatively low cost, while consuming a relatively small amount of space on an integrated circuit.

It should be appreciated that the various components and features described herein may be incorporated in a system independently of the other components and features. For example, a system incorporating the teachings herein may include various combinations of these components and features. Thus, not all of the components and features described herein may be employed in every such system.

Different embodiments of the invention may include a variety of hardware and software processing components. In some embodiments of the invention, hardware components such as controllers, state machines and/or logic are used in a system constructed in accordance with the invention. In some embodiment of the invention, code such as software or firmware executing on one or more processing devices may be used to implement one or more of the described operations.

Such components may be implemented on one or more integrated circuits. For example, in some embodiments several of these components may be combined within a single integrated circuit. In some embodiments some of the components may be implemented as a single integrated circuit. In some embodiments some components may be implemented as several integrated circuits.

The components and functions described herein may be connected/coupled in many different ways. The manner in which this is done may depend, in part, on whether the components are separated from the other components. In some embodiments some of the connections represented by the lead lines in the drawings may be in an integrated circuit, on a circuit board and/or over a backplane to other circuit boards. In some embodiments some of the connections represented by the lead lines in the drawings may comprise a data network, for example, a local network and/or a wide area network (e.g., the Internet).

The signals discussed herein may take several forms. For example, in some embodiments a signal may be an electrical signal transmitted over a wire while other signals may consist of light pulses transmitted over an optical fiber.

A signal may comprise more than one signal. For example, a signal may consist of a series of signals. Also, a differential signal comprises two complementary signals or some other combination of signals. In addition, a group of signals may be collectively referred to herein as a signal.

Signals as discussed herein also may take the form of data. For example, in some embodiments an application program may send a signal to another application program. Such a signal may be stored in a data memory.

The components and functions described herein may be connected/coupled directly or indirectly. Thus, in some embodiments there may or may not be intervening devices (e.g., buffers) between connected/coupled components.

A wide variety of devices may be used to implement the data memories discussed herein. For example, a data memory may comprise Flash memory, one-time-programmable (OTP) memory or other types of data storage devices.

In summary, the invention described herein generally relates to an improved data security system. While certain exemplary embodiments have been described above in detail and shown in the accompanying drawings, it is to be understood that such embodiments are merely illustrative of and not restrictive of the broad invention. In particular, it should be recognized that the teachings of the invention apply to a wide variety of systems and processes. It will thus be recognized that various modifications may be made to the illustrated and other embodiments of the invention described above, without departing from the broad inventive scope thereof. For example, cryptographic algorithms and techniques other than those specifically mentioned above may be employed. In addition, components and operations may be distributed in ways other than those specifically shown. In view of the above it will be understood that the invention is not limited to the particular embodiments or arrangements disclosed, but is rather intended to cover any changes, adaptations or modifications which are within the scope and spirit of the invention as defined by the appended claims.

What is claimed is:

1. A security processing system comprising:
   at least one key generator for generating an identity cipher key within an integrated circuit;
   at least one data memory within the integrated circuit for storing the identity cipher key;
   at least one processor configured to:
      receive, in response to a need for a usage cipher key, in a stateless hardware security module of the integrated circuit, both an encrypted usage cipher key and a policy including conditions related to the use of the usage cipher key;
      decrypt the encrypted usage cipher key using the identity cipher key to obtain the usage cipher key;
      store the usage cipher key in the at least one data memory;
      use the usage cipher key to cryptographically process data; and
      enforce the received policy;
   a low frequency protection circuit coupled to the at least one processor, wherein the low frequency protection circuit is configured to detect and take corrective action when the operating frequency of the stateless hardware module falls below a predefined threshold; and
   an operating point protection circuit coupled to the at least one processor, wherein the operating point protection circuit is configured to:
      monitor a clock of the stateless hardware module, and
      detect violations of a timing path in the stateless hardware module.

2. The system of claim 1 wherein the at least one key generator comprises an asymmetric key generator.

3. The system of claim 1 wherein the identity cipher key comprises a private key.

4. The system of claim 1 comprising at least one data interface for publishing a public key outside the integrated circuit.

5. The system of claim 1 comprising at least one data interface for receiving encrypted keys from a device.

6. The system of claim 5 wherein the at least one processor decrypts encrypted keys received from a device.

7. The system of claim 6 comprising at least one encryption accelerator configured to receive the decrypted cipher key.

8. A security processing system comprising:
   at least one data interface for receiving an identity cipher key within an integrated circuit;
   at least one data memory within the integrated circuit for storing the identity cipher key;
   at least one processor configured to:
      receive, in response to a need for a usage cipher key in a stateless hardware module of the integrated circuit, both an encrypted usage cipher key and a policy including conditions related to the use of the usage cipher key;
      decrypt the encrypted usage cipher key using the identity cipher key to obtain the usage cipher key;
      store the usage cipher key in the at least one data memory;
      use the usage cipher key to cryptographically process data; and
      enforce the received policy;
   a low frequency protection circuit coupled to the at least one processor, wherein the low frequency protection circuit is configured to detect and take corrective action when the operating frequency of the stateless hardware module falls below a predefined threshold; and
   an operating point protection circuit coupled to the at least one processor, wherein the operating point protection circuit is configured to:
      monitor a clock of the stateless hardware module, and
      detect violations of a timing path in the stateless hardware module.

9. The system of claim 8 comprising at least one data interface for receiving data to be encrypted.

10. The system of claim 9 wherein the at least one processor encrypts the data.

11. The system of claim 10 wherein the at least one data interface transmits the encrypted data to a device.

12. The security processing system of claim 8, wherein the at least one data memory within the integrated circuit for storing the identity cipher key is a non-volatile memory.

13. The security processing system of claim 12, wherein the non-volatile memory is a one-time programmable memory comprising thin gate-oxide fuses and implemented in the integrated circuit using any MOS process.

14. The security processing system of claim 13, wherein the one-time-programmable memory is implemented in the integrated circuit using a single poly process.

15. The security processing system of claim 13, wherein the one-time-programmable memory is configured to store the identity cipher key by generating direct gate tunneling current through a gate oxide in at least a portion of the thin gate-oxide fuses.

16. The security processing system of claim 8, wherein the low frequency protection circuit is further configured to:
 monitor a time tick register value; and
 prevent, based upon the time tick register value, a key from being used beyond a threshold that is associated with a value specified in a key policy.

* * * * *